United States Patent
Miller et al.

(10) Patent No.: US 12,153,396 B2
(45) Date of Patent: Nov. 26, 2024

(54) INDUSTRIAL AUTOMATION ASSET AND CONTROL PROJECT ANALYSIS

(71) Applicant: Rockwell Automation Technologies, Inc., Mayfield Heights, OH (US)

(72) Inventors: Scott A Miller, Mayfield Heights, OH (US); Nathan Reynolds, Bonsall, CA (US); Christopher Wayne Como, Mayfield Heights, OH (US); Nathaniel S Sandler, Chagrin Falls, OH (US); Ryan P Dunn, Mayfield Heights, OH (US); Bruce T McCleave, Jr., Mission Viejo, CA (US); Kyle Reissner, Hudson, OH (US); Stephen C Briant, Wexford, PA (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 0 days.

(21) Appl. No.: 18/324,227

(22) Filed: May 26, 2023

(65) Prior Publication Data

US 2023/0324880 A1 Oct. 12, 2023

Related U.S. Application Data

(63) Continuation of application No. 17/817,447, filed on Aug. 4, 2022, now Pat. No. 11,703,827, which is a
(Continued)

(51) Int. Cl.
*G05B 19/4093* (2006.01)
*G05B 19/418* (2006.01)
*G06Q 10/087* (2023.01)

(52) U.S. Cl.
CPC ... *G05B 19/4093* (2013.01); *G05B 19/41885* (2013.01); *G06Q 10/087* (2013.01); *G05B 2219/31229* (2013.01)

(58) Field of Classification Search
CPC .......... G05B 19/4093; G05B 19/41885; G05B 2219/31229; G06Q 10/087
See application file for complete search history.

(56) References Cited

U.S. PATENT DOCUMENTS

| | | | |
|---|---|---|---|
| 7,984,420 | B2 | 7/2011 | Eldridge et al. |
| 8,312,419 | B2 | 11/2012 | Wilcock et al. |
| (Continued) | | | |

FOREIGN PATENT DOCUMENTS

| | | |
|---|---|---|
| CN | 103685442 A | 3/2014 |
| CN | 104142629 A | 11/2014 |
| (Continued) | | |

OTHER PUBLICATIONS

A. Marrella, A. Monreale, B. Kloepper and M. W. Krueger, "Privacy-Preserving Outsourcing of Pattern Mining of Event-Log Data—A Use-Case from Process Industry," 2016 IEEE International Conference on Cloud Computing Technology and Science (CloudCom), Luxembourg, Luxembourg, 2016, pp. 545-551 (Year: 2016).*

(Continued)

*Primary Examiner* — Christopher E. Everett
(74) *Attorney, Agent, or Firm* — Amin, Turocy & Watson, LLP

(57) ABSTRACT

An industrial development hub (IDH) supports industrial development and testing capabilities that are offered as a cloud-based service. The IDH comprises an enhanced storage platform and associated design tools that serve as a repository on which customers can store control project code, device configurations, and other digital aspects of an industrial automation project. The IDH system can facilitate
(Continued)

discovery and management of digital content associated with control systems, and can be used for system backup and restore, code conversion, and version management.

20 Claims, 18 Drawing Sheets

Related U.S. Application Data continuation of application No. 17/011,213, filed on Sep. 3, 2020, now Pat. No. 11,449,028.

(56) References Cited

U.S. PATENT DOCUMENTS

| | | | |
|---|---|---|---|
| 8,788,959 B1 | 7/2014 | Ogami et al. | |
| 10,853,536 B1 | 12/2020 | Steingrimsson et al. | |
| 10,878,218 B2 | 12/2020 | Whelan, III et al. | |
| 10,942,710 B1 | 3/2021 | Dunn et al. | |
| 2005/0071035 A1 | 3/2005 | Strang | |
| 2005/0183143 A1 | 8/2005 | Anderholm et al. | |
| 2005/0222698 A1* | 10/2005 | Eryurek | G06F 8/34 700/90 |
| 2007/0022408 A1 | 1/2007 | Brandt et al. | |
| 2007/0156792 A1 | 7/2007 | D'Souza et al. | |
| 2007/0208549 A1 | 9/2007 | Blevins et al. | |
| 2008/0208374 A1 | 8/2008 | Grgic et al. | |
| 2009/0099832 A1 | 4/2009 | Nasle | |
| 2009/0100159 A1 | 4/2009 | Extra | |
| 2010/0115490 A1 | 5/2010 | Wilcock et al. | |
| 2013/0274940 A1 | 10/2013 | Wei et al. | |
| 2014/0032169 A1* | 1/2014 | McCarthy | G05B 19/4184 702/182 |
| 2014/0047107 A1 | 2/2014 | Maturana et al. | |
| 2014/0337277 A1 | 11/2014 | Asenjo et al. | |
| 2015/0074749 A1 | 3/2015 | Vasko et al. | |
| 2015/0185719 A1 | 7/2015 | Sauvain | |
| 2016/0179993 A1 | 6/2016 | Maturana et al. | |
| 2016/0182309 A1 | 6/2016 | Maturana et al. | |
| 2016/0274552 A1 | 9/2016 | Strohmenger et al. | |
| 2016/0274553 A1 | 9/2016 | Strohmenger et al. | |
| 2016/0274558 A1* | 9/2016 | Strohmenger | G06Q 10/06 |
| 2016/0274978 A1 | 9/2016 | Strohmenger et al. | |
| 2017/0053244 A1 | 2/2017 | Khalil | |
| 2017/0123397 A1* | 5/2017 | Billi | G05B 19/048 |
| 2017/0323274 A1 | 11/2017 | Johnson et al. | |
| 2017/0351226 A1 | 12/2017 | Bliss et al. | |
| 2018/0052451 A1 | 2/2018 | Billi-Duran et al. | |
| 2018/0131907 A1 | 5/2018 | Schmirler et al. | |
| 2018/0173182 A1 | 6/2018 | Miller et al. | |
| 2018/0300437 A1 | 10/2018 | Thomsen et al. | |
| 2018/0356792 A1 | 12/2018 | Chao et al. | |
| 2018/0357334 A1 | 12/2018 | Chao et al. | |
| 2019/0056715 A1 | 2/2019 | Subramaniyan et al. | |
| 2019/0064787 A1 | 2/2019 | Maturana | |
| 2019/0102055 A1 | 4/2019 | Naidoo et al. | |
| 2019/0138667 A1 | 5/2019 | Benesh et al. | |
| 2019/0138970 A1 | 5/2019 | Deutsch et al. | |
| 2019/0163215 A1 | 5/2019 | Cheng et al. | |
| 2019/0220796 A1 | 7/2019 | Khalil | |
| 2019/0227778 A1 | 7/2019 | Ma et al. | |
| 2019/0236489 A1 | 8/2019 | Koudal et al. | |
| 2019/0356739 A1 | 11/2019 | Hart et al. | |
| 2020/0012265 A1 | 1/2020 | Thomsen et al. | |
| 2020/0103877 A1 | 4/2020 | Truong et al. | |
| 2020/0118053 A1 | 4/2020 | Chapin | |
| 2020/0249663 A1 | 8/2020 | Liu et al. | |
| 2020/0358617 A1 | 11/2020 | Baierlein et al. | |
| 2021/0089278 A1 | 3/2021 | Dunn et al. | |
| 2021/0096704 A1 | 4/2021 | Ericsson et al. | |
| 2021/0096827 A1 | 4/2021 | Stump et al. | |
| 2021/0096978 A1 | 4/2021 | Stump et al. | |
| 2021/0193334 A1 | 6/2021 | Turrin et al. | |
| 2021/0312393 A1 | 10/2021 | Stump et al. | |

FOREIGN PATENT DOCUMENTS

| | | |
|---|---|---|
| CN | 104142661 A | 11/2014 |
| CN | 104142662 A | 11/2014 |
| CN | 104142663 A | 11/2014 |
| CN | 104142664 A | 11/2014 |
| CN | 104142679 A | 11/2014 |
| CN | 104144204 A | 11/2014 |
| CN | 104954242 A | 9/2015 |
| CN | 105589349 A | 5/2016 |
| CN | 105988367 A | 10/2016 |
| CN | 105988450 A | 10/2016 |
| CN | 105988451 A | 10/2016 |
| CN | 105991765 A | 10/2016 |
| CN | 106020138 A | 10/2016 |
| CN | 107026894 A | 8/2017 |
| CN | 107589727 A | 1/2018 |
| CN | 107832497 A | 3/2018 |
| CN | 108089696 A | 5/2018 |
| CN | 108491626 A | 9/2018 |
| CN | 109408102 A | 3/2019 |
| CN | 110187686 A | 8/2019 |
| CN | 111562769 A | 8/2020 |
| EP | 2 801 941 A1 | 11/2014 |
| EP | 2 846 208 A2 | 3/2015 |
| EP | 3 070 548 A2 | 9/2016 |
| EP | 3 255 590 A1 | 12/2017 |
| EP | 3 318 944 A2 | 5/2018 |
| EP | 3 318 945 A2 | 5/2018 |
| EP | 3318945 | 5/2018 |
| EP | 3 511 820 A1 | 7/2019 |
| EP | 3 511 824 A1 | 7/2019 |
| EP | 3 528 110 A1 | 8/2019 |
| EP | 3528110 | 8/2019 |
| EP | 3 564 881 A1 | 11/2019 |
| EP | 3 584 751 A1 | 12/2019 |
| EP | 3 663 937 A1 | 6/2020 |
| EP | 3 696 622 A1 | 8/2020 |
| JP | 2017-084224 A | 5/2017 |
| WO | 2019/211288 A1 | 11/2019 |
| WO | 2020/162879 A1 | 8/2020 |
| WO | 2021/165524 A1 | 8/2021 |

OTHER PUBLICATIONS

Non-Final Office Action received for U.S. Appl. No. 17/026,784 dated Aug. 26, 2021, 61 pages.
Extended European Search Report received for European Patent Application Serial No. 21184855.1 dated Oct. 18, 2021, 8 pages.
Notice of Allowance received for U.S. Appl. No. 17/015,928 dated Dec. 14, 2021, 36 pages.
Final Office Action received for U.S. Appl. No. 17/026,784 dated Nov. 29, 2021, 86 pages.
Extended European Search Report received for European Patent Application Serial No. 21179688.3 dated Nov. 25, 2021, 9 pages.
Extended European Search Report received for European Patent Application Serial No. 21180071.9 dated Dec. 8, 2021, 11 pages.
Extended European Search Report received for European Patent Application Serial No. 21180042.0 dated Dec. 8, 2021, 11 pages.
Extended European Search Report received for European Patent Application Serial No. 21180217.8 dated Dec. 9, 2021, 8 pages.
Extended European Search Report received for European Patent Application Serial No. 21180277.2 dated Dec. 16, 2021, 12 pages.
Markovtsev et al., "Style-Analyzer: Fixing Code Style Inconsistencies with Interpretable Unsupervised Algorithms", International Conference on Mining Software Repositories, IEEE, May 25, 2019, 11 pages.
Anonymous: "Visual Studio IntelliCode Visual Studio—Visual Studio", Sep. 2, 2020 (Sep. 2, 2020), 2 pages.
Non-Final Office Action received for U.S. Appl. No. 17/015,710 dated Apr. 20, 2022, 119 pages.
Ang et al., "PID Control System Analysis, Design, and Technology", IEEE Transactions on Control Systems Technology, vol. 13, No. 4, Jul. 2005, pp. 559-576.
Feng et al., "A Survey on Analysis and Design of Model-based Fuzzy Control Systems", IEEE Transactions on Fuzzy Systems, vol. 14, No. 5, 2006, pp. 676-697.

(56) References Cited

OTHER PUBLICATIONS

Monmasson et al., "FPGA Design Methodology for Industrial Control Systems—A Review", IEEE Transactions on Industrial Electronics, vol. 54, No. 4, 2007, pp. 1824-1842.
Non-Final Office Action received for U.S. Appl. No. 17/011,213 dated Feb. 25, 2022, 47 pages.
Non-Final Office Action received for U.S. Appl. No. 17/018,446 dated Apr. 19, 2022, 37 pages.
Communication pursuant to Rule 69 EPC received for European Patent Application Serial No. 21179688.3 dated Mar. 21, 2022, 2 pages.
Communication pursuant to Rule 69 EPC received for European Patent Application Serial No. 21180277.2 dated Mar. 21, 2022, 2 pages.
Communication pursuant to Rule 69 EPC received for European Patent Application Serial No. 21180217.8 dated Mar. 14, 2022, 2 pages.
Communication pursuant to Rule 69 EPC received for European Patent Application Serial No. 21180071.9 dated Mar. 21, 2022, 2 pages.
Communication pursuant to Rule 69 EPC received for European Patent Application Serial No. 21180042.0 dated Mar. 28, 2022, 2 pages.
Communication pursuant to Rule 69 EPC received for European Patent Application Serial No. 21184855.1 dated Apr. 4, 2022, 2 pages.
Final Office Action received for U.S. Appl. No. 17/018,446 dated Aug. 11, 2022, 31 pages.
Notice of Allowance received for U.S. Appl. No. 17/015,710 dated Sep. 15, 2022, 60 pages.
Wang et al., "A Realistic Power Consumption Model for Wireless Sensor Network Devices", IEEE, vol. 1, Oct. 2006, pp. 286-295.
Meira et al., "Survey on Wireless Sensor Network Devices", IEEE, vol. 1, 2003, pp. 537-544.
Tolle et al.,"Design of an application-cooperative management system for wireless sensor networks", Proceedings of the Second European Workshop on Wireless Sensor Networks, IEEE, 2005, pp. 1-12.
Non-Final Office Action received for U.S. Appl. No. 17/033,115 dated Sep. 28, 2022, 47 pages.
Communication Pursuant to Article 94(3) EPC received for European Patent Application Serial No. 21180277.2 dated Nov. 3, 2022, 6 pages.
Notice of Allowance received for U.S. Appl. No. 17/817,447 dated Mar. 1, 2023, 219 pages.
Non-Final Office Action received for U.S. Appl. No. 17/018,446 dated Jan. 27, 2023, 34 pages.
Final Office Action received for U.S. Appl. No. 17/033,115 dated Feburary 28, 2023, 35 pages.
Non-Final Office Action received for U.S. Appl. No. 17/851,180 dated Feb. 23, 2023, 127 pages.
Notice of Allowance received for U.S. Appl. No. 17/817,447 dated May 24, 2023, 6 pages.
Final Office Action received for U.S. Appl. No. 17/018,446 dated May 11, 2023, 27 pages.
Notice of Allowance received for U.S. Appl. No. 17/033,115 dated Jun. 21, 2023, 55 pages.
Supplemental Notice of Allowance received for U.S. Appl. No. 17/033,115 dated Jul. 5, 2023, 10 pages.
Notice of Allowance received for U.S. Appl. No. 17/851,180 dated May 25, 2023, 119 pages.
Notice of Allowance received for U.S. Appl. No. 17/033,115 dated Aug. 23, 2023, 10 pages.
Notice of Allowance received for U.S. Appl. No. 17/679,256 dated Oct. 10, 2023, 87 pages.
Notice of Allowance received for U.S. Appl. No. 18/067,573 dated Oct. 4, 2023, 108 pages.
Dillon et al., "Cloud Computing: Issues and Challenges", 24th IEEE international Conference on Advanced Information Networking And Applications, IEEE, 2010, pp. 27-33.
Rimal et al., "A Taxonomy and Survey of Cloud Computing Systems", Fifth International Joint Conference on inc, ims and idc, IEEE, 2009, pp. 44-51.
Porter et al., "How Smart, Connected Products are Transforming Companies", Harvard Business Review, Oct. 2015, 19 pages.
First Office Action received for Chinese Patent Application Serial No. 202110730283.5 dated Oct. 19, 2023, 14 pages.
First Office Action received for Chinese Patent Application Serial No. 202110730406.5 dated Dec. 20, 2023, 13 pages.
OA for CN202110730283.5 dated Jan. 2, 2024.
Communication Pursuant to Article 94(3) EPC received for European Patent Application Serial No. EP21184855.1 dated Dec. 19, 2023, 7 pages.
Notification of grant received for Chinese Patent Application Serial No. 202110730283.5 dated Mar. 13, 2024, 3 pages (Including English Translation).
Communication Pursuant to Article 94(3) EPC received for European Patent Application Serial No. 21180042.0 dated May 22, 2024, 10 pages.
Second Office Action received for Chinese Patent Application Serial No. 202110730406.5 dated Apr. 24, 2024, 19 pages (Including English Translation).
Communication Pursuant to Article 94(3) EPC received for European Patent Application Serial No. 21180071.9 dated Jan. 17, 2024, 14 pages.
Notice of Allowance received for U.S. Appl. No. 17/679,256 dated Jan. 16, 2024, 12 pages.

\* cited by examiner

INDUSTRIAL AUTOMATION ASSET AND CONTROL PROJECT ANALYSIS

CROSS-REFERENCE TO RELATED APPLICATIONS

This application is a continuation of, and claims priority to, U.S. patent application Ser. No. 17/817,447, filed on Aug. 4, 2022, and entitled "INDUSTRIAL AUTOMATION ASSET AND CONTROL PROJECT ANALYSIS," which is a continuation of U.S. patent application Ser. No. 17/011,213, filed on Sep. 3, 2020. The entireties of these related applications are incorporated herein by reference.

BACKGROUND

The subject matter disclosed herein relates generally to industrial automation systems, and, for example, to industrial programming development platforms

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system for analyzing industrial control projects is provided, comprising a user interface component configured to receive, from a client device via a cloud platform, an industrial control project comprising at least control programming and device configuration data that, in response to execution on one or more industrial devices, facilitate monitoring and control of an industrial automation system; a project telemetry component configured to generate project telemetry data based on a first analysis of the industrial control project, the project telemetry data defining characteristics of the one or more industrial devices and predicted operating characteristics of the industrial control project inferred based on the first analysis; and a project analysis component configured to perform a second analysis on the project telemetry data and to generate, based on a result of the second analysis, a recommendation for modifying the industrial control project in a manner that improves one or more of the predicted operating characteristics, wherein the user interface component is configured to render the recommendation on the client device.

Also, one or more embodiments provide a method for analyzing industrial control projects, comprising receiving, by a system comprising a processor via a cloud platform, an industrial control project comprising at least control programming and device configuration data that, in response to execution on one or more industrial devices, facilitate monitoring and control of an industrial automation system; generating, by the system, project telemetry data based on a first analysis of the industrial control project, the project telemetry data defining characteristics of the one or more industrial devices and predicted operating characteristics of the industrial control project inferred based on the first analysis; generating, by the system based on a second analysis performed on the project telemetry data and to generate, a recommendation for modifying the industrial control project in a manner that improves one or more of the predicted operating characteristics; and rendering, by the system, the recommendation on a client device.

Also, according to one or more embodiments, a non-transitory computer-readable medium is provided having stored thereon instructions that, in response to execution, cause a system executing on a cloud platform and comprising a processor to perform operations, the operations comprising receiving, via a cloud platform, an industrial control project comprising at least control programming and device configuration data that, in response to execution on one or more industrial devices, facilitate monitoring and control of an industrial automation system; generating project telemetry data based on a first analysis of the industrial control project, the project telemetry data defining characteristics of the one or more industrial devices and predicted operating characteristics of the industrial control project inferred based on the first analysis; generating, based on a second analysis performed on the project telemetry data and to generate, a recommendation for modifying the industrial control project in a manner that improves one or more of the predicted operating characteristics; and rendering the recommendation on a client device.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
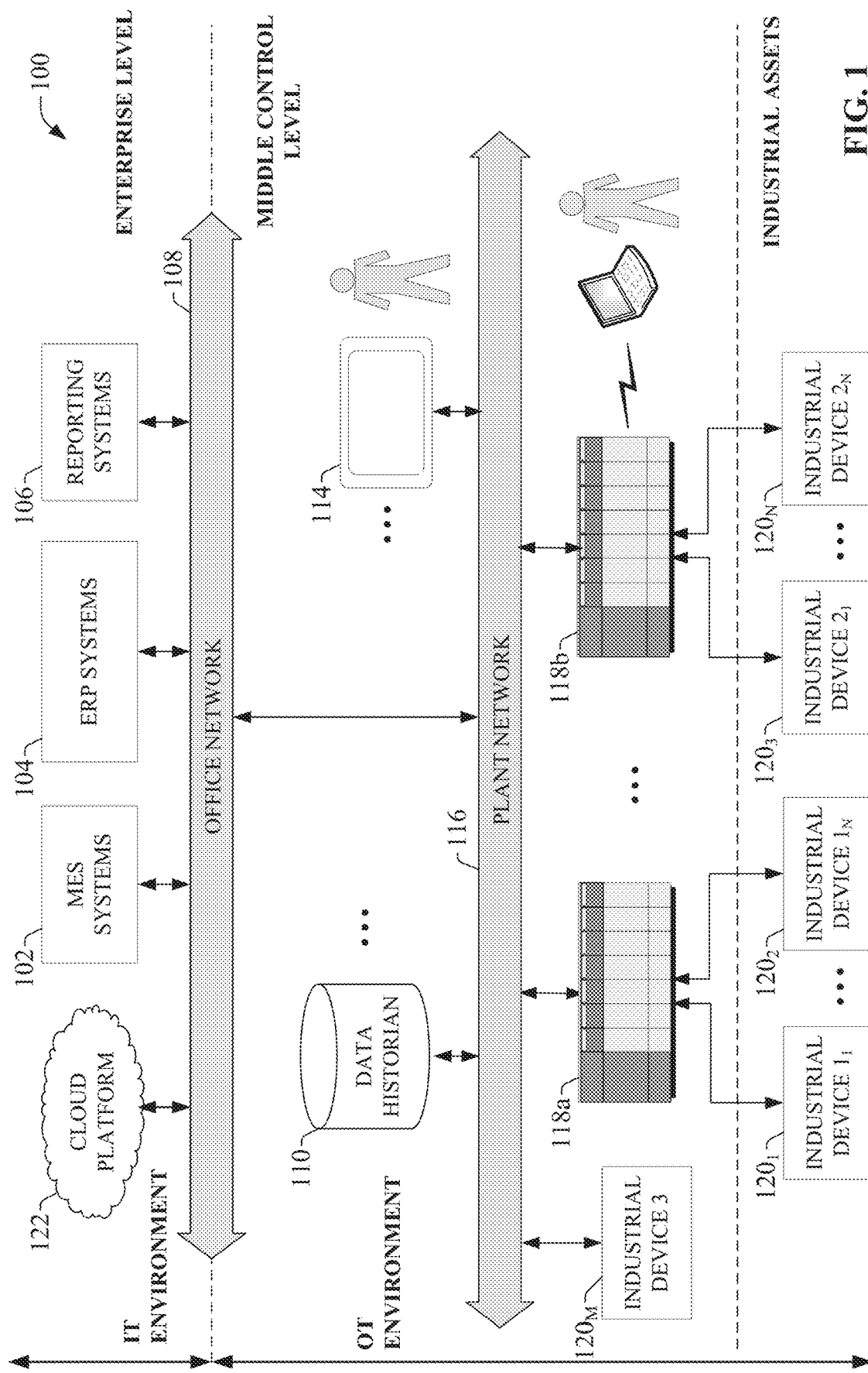
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 is a block diagram of an example industrial environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial assets or systems (e.g., industrial machines). One or more industrial controllers 118 may also comprise a soft controller executed on a personal computer, on a server blade, or other hardware platform, or on a cloud platform. Some hybrid devices may also combine controller functionality with other functions (e.g., visualization). The control programs executed by industrial controllers 118 can comprise any conceivable type of code used to process input signals read from the industrial devices 120 and to control output signals generated by the industrial controllers, including but not limited to ladder logic, sequential function charts, function block diagrams, structured text, C++, Python, Javascript, etc.

Industrial devices 120 may include input devices that provide data relating to the controlled industrial systems to the industrial controllers 118, output devices that respond to control signals generated by the industrial controllers 118 to control aspects of the industrial systems, or devices that act as both input and output devices. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, and the like. Some industrial devices, such as industrial device 120M, may operate autonomously on the plant network 116 without being controlled by an industrial controller 118.

Industrial controllers 118 may communicatively interface with industrial devices 120 over hardwired connections or over wired or wireless networks. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over the plant network 116 using, for example, a communication module or an integrated networking port. Exemplary networks can include the Internet, intranets, Ethernet, EtherNet/IP, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by the control program and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer. HMIs may comprise fixed location or mobile devices with either user-installed or pre-installed operating systems, and either user-installed or pre-installed graphical application software.

Some industrial environments may also include other systems or devices relating to specific aspects of the controlled industrial systems. These may include, for example, one or more data historians 110 that aggregate and store production information collected from the industrial controllers 118 and other industrial devices.

Industrial devices 120, industrial controllers 118, HMIs 114, associated controlled industrial assets, and other plant-floor systems such as data historians 110, vision systems, and other such systems operate on the operational technology (OT) level of the industrial environment. Higher level analytic and reporting systems may operate at the higher enterprise level of the industrial environment in the information technology (IT) domain; e.g., on an office network 108 or on a cloud platform 122. Such higher level systems can include, for example, enterprise resource planning (ERP) systems 104 that integrate and collectively manage high-level business operations, such as finance, sales, order management, marketing, human resources, or other such business functions. Manufacturing Execution Systems (MES) 102 can monitor and manage control operations on the control level given higher-level business considerations. Reporting systems 106 can collect operational data from industrial devices on the plant floor and generate daily or shift reports that summarize operational statistics of the controlled industrial assets.

OT level systems can be disparate and complex, and may integrate with many physical devices. This challenging environment, together with domain-specific programming and development languages, can make development of control systems on the OT level difficult, resulting in long development cycles in which new control system designs are developed, tested, and finally deployed. Moreover, given the general lack of current virtualization and simulation capabilities, industrial automation systems must be purchased, programmed, and installed in the physical operating environment before realistic testing or optimization can begin. This workflow often results in project delays or cost overruns. Moreover, the inherent complexity and custom nature of installed industrial monitoring and control systems can make it difficult for owners of industrial assets—e.g., plant owners or industrial enterprise entities—to manage their OT-level systems and to protect their proprietary intellectual property from catastrophic failures or cyber-attacks.

To address these and other issues, one or more embodiments described herein provide a cloud-based Industrial Development Hub (IDH) that supports development and testing capabilities for industrial customers that are easy to use and offered as a service. The IDH comprises an enhanced storage platform and associated design tools—collectively referred to as the Vault—which serves as a repository on which customers can store control project code, device configurations, and other digital aspects of an industrial automation project. The IDH system can facilitate easy discovery and management of digital content associated with control systems, and can be used for system backup and restore, code conversion, and version management.

Figure 2:
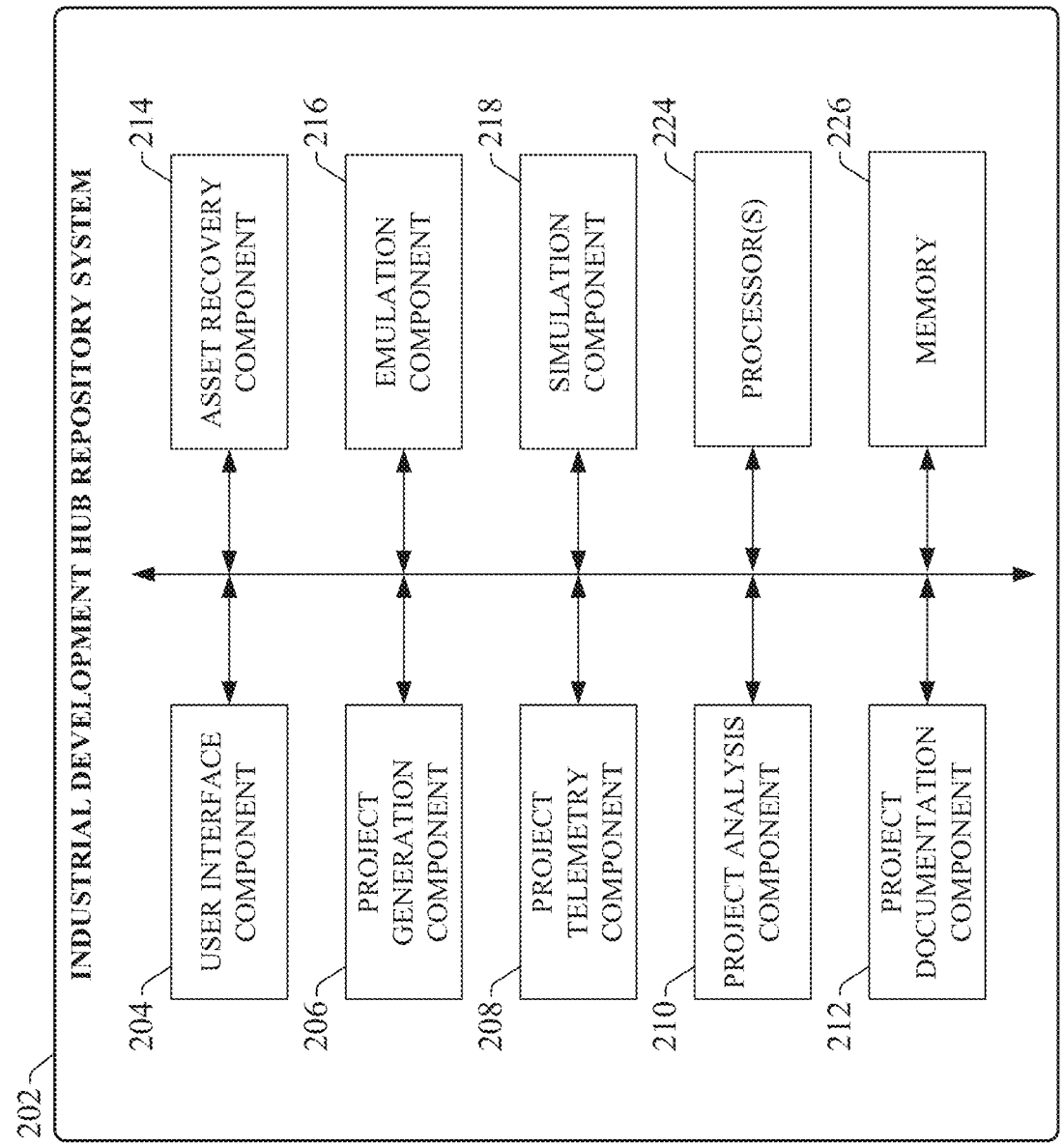
FIG. 2 is a block diagram of an example industrial development hub (IDH) repository system.

FIG. 2 is a block diagram of an example industrial development hub (IDH) repository system 202 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

IDH repository system 202 can include a user interface component 204, a project generation component 206, a project telemetry component 208, a project analysis component 210, a project documentation component 212, an asset recovery component 214, an emulation component 216, a simulation component 218, one or more processors 224, and memory 228. In various embodiments, one or more of the user interface component 204, project generation component 206, project telemetry component 208, project analysis component 210, project documentation component 212, asset recovery component 214, emulation component 216, simulation component 218, the one or more processors 224, and memory 226 can be electrically and/or communicatively coupled to one another to perform one or more of the functions of the IDH repository system 202. In some embodiments, components 204, 206, 208, 210, 212, 214, 216, and 218 can comprise software instructions stored on memory 226 and executed by processor(s) 224. IDH repository system 202 may also interact with other hardware and/or software components not depicted in FIG. 2. For example, processor(s) 224 may interact with one or more external user interface devices, such as a keyboard, a mouse, a display monitor, a touchscreen, or other such interface devices.

IDH repository system 202 can be implemented on a cloud platform as a set of cloud-based services to facilitate access by a diverse range of users having business or technical relationships, including industrial equipment owners (e.g., industrial enterprise entities or plant owners), equipment vendors, original equipment manufacturers (OEMs), system integrators, or other such user entities. The cloud platform on which the system 202 executes can be any infrastructure that allows shared computing services to be accessed and utilized by cloud-capable devices. The cloud platform can be a public cloud accessible via the Internet by devices having Internet connectivity and appropriate authorizations to utilize the IDH repository services. In some scenarios, the cloud platform can be provided by a cloud provider as a platform-as-a-service (PaaS), and the IDH repository system 202 can reside and execute on the cloud platform as a cloud-based service. In some such configurations, access to the cloud platform and associated IDH repository services can be provided to customers as a subscription service by an owner of the IDH repository system 202. Alternatively, the cloud platform can be a private cloud operated internally by the industrial enterprise (the owner of the plant facility). An example private cloud platform can comprise a set of servers hosting the IDH repository system 202 and residing on a corporate network protected by a firewall.

User interface component 204 can be configured to receive user input and to render output to the user in any suitable format (e.g., visual, audio, tactile, etc.). In some embodiments, user interface component 204 can be configured to communicatively interface with a client device (e.g., a laptop computer, tablet computer, smart phone, etc.) that is communicatively connected to the IDH repository system 202 (e.g., via a hardwired or wireless connection). The user interface component 204 can then serve an IDH interface environment to the client device, through which the system 202 receives user input data and renders output data. In other embodiments, user interface component 204 can be configured to generate and serve suitable interface screens to the client device (e.g., program development screens, project submission screens, analysis result screens, etc.), and exchange data via these interface screens. Input data that can be received via various embodiments of user interface component 204 can include, but is not limited to, programming code (including industrial control programming, such as ladder logic programming), device configuration data, engineering drawings, HMI applications, or other such input. Output data rendered by various embodiments of user interface component 204 can include program code, programming feedback (e.g., error and highlighting, coding suggestions, etc.), control project telemetry and recommendations, project testing results, etc.

Project generation component 206 can be configured to create a control system project comprising one or more project files based on design input received via the user interface component 204, as well as industrial knowledge, predefined code modules, and asset models maintained by the IDH repository system 202. The control system project can comprise one or more of industrial control code (e.g., ladder logic, structured text, function block diagrams, etc.), HMI applications comprising one or more HMI interface screen definitions, device configuration files, or other such project files.

Project telemetry component 208 can be configured to analyze an industrial control project submitted by a user and generate project telemetry, or statistical information, for the submitted project based on the analysis. Example project telemetry data that can be generated by the project telemetry component 208 can include, but is not limited to, an inventory of devices used in the project, information regarding how the devices are being used, reports indicating how close to hardware or software capacity limitations the devices or associated software will be operating, how much memory or energy is expected to be consumed by the project during runtime, or other such statistics.

Project analysis component 210 is configured to analyze the project telemetry data generated by the project telemetry component 208 and generate design recommendations or warnings based on this analysis. Project analysis component 210 can also generate device or equipment usage statistics inferred from multiple projects submitted by multiple end customers for use by equipment vendors or OEMs.

Project documentation component 212 can be configured to generate a variety of project hand-off or validation documents based on analysis of the control system project, including but not limited to approval documents, safety validation checklists, I/O checkout documents, audit documentation, or other such documents. Asset recovery component 214 can be configured to collect and archive backups of control project files and device configurations, and deploy these archived project files as needed for disaster recovery or remote deployment purposes. Emulation component 216 can be configured to emulate execution of an industrial control project being testing on a virtualized (or emulated) industrial controller. Simulation component 218 can be configured to simulate operation of a virtualized model of an industrial automation system under control of an industrial control project being emulated.

The one or more processors 224 can perform one or more of the functions described herein with reference to the systems and/or methods disclosed. Memory 226 can be a computer-readable storage medium storing computer-executable instructions and/or information for performing the functions described herein with reference to the systems and/or methods disclosed.

Figure 3:
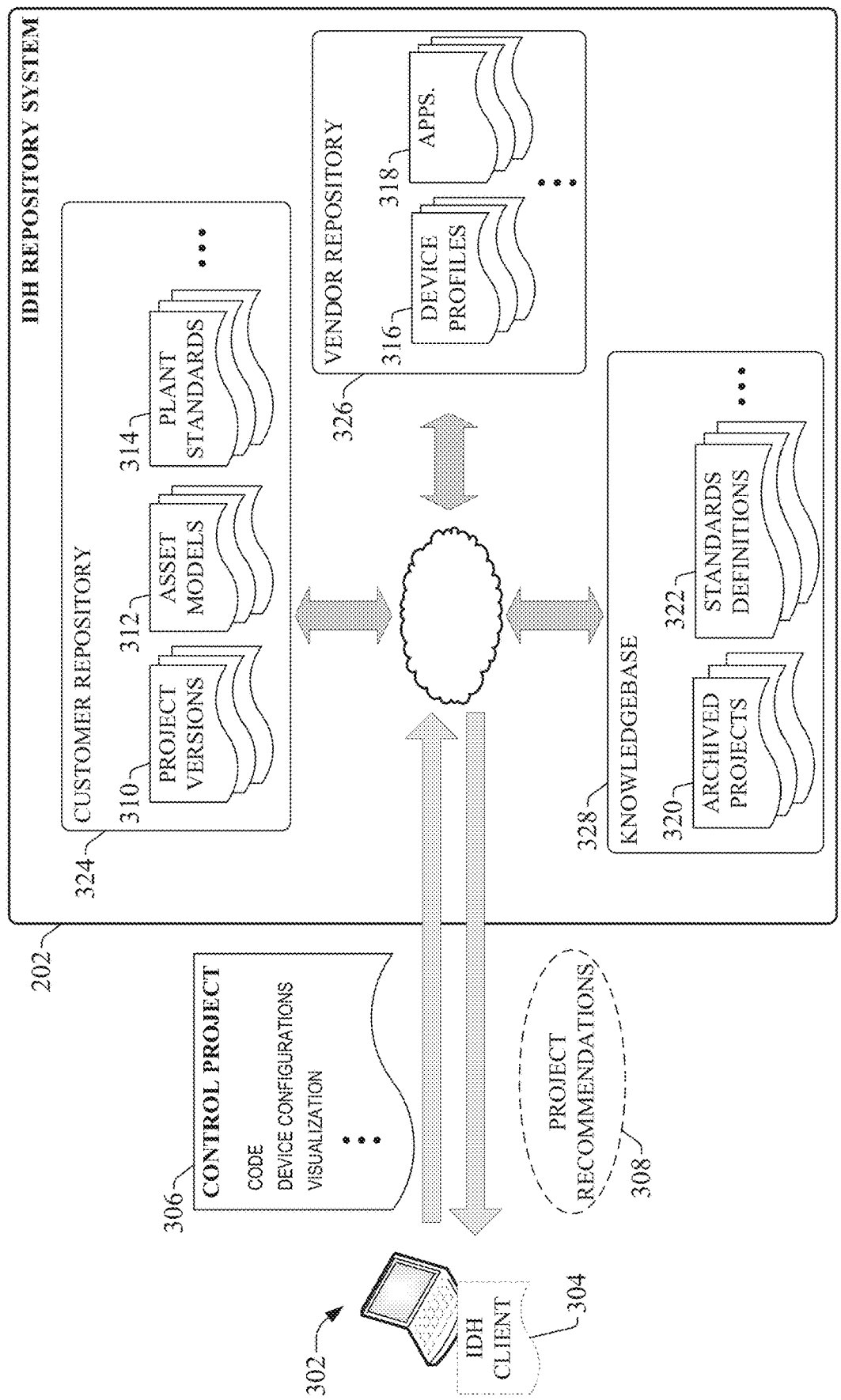
FIG. 3 is a diagram illustrating a generalized architecture of the IDH repository system.

FIG. 3 is a diagram illustrating a generalized architecture of the IDH repository system 202 according to one or more embodiments. As noted above, IDH repository system 202 can execute on a cloud platform as a set of cloud-based storage, analysis, and project editing services. A client device 302 (e.g., a laptop computer, tablet computer, desktop computer, mobile device, wearable AR/VR appliance, etc.) can access the repository system's project development and analysis tools and leverage these tools to either upload or create a control project for an automation system being developed. To this end, the system's user interface component 204 can remotely serve an IDH client 304 to the client device 302. The IDH client 304 comprises a number of interface displays that serve as an interface to the system 202.

Using the tools offered by the repository system 202, the user can submit a control project 306 to the repository system 202. In general, a control project 306 comprises digital data or files that, when executed on corresponding industrial devices deployed within an industrial environment, facilitate monitoring and control of an automation system or industrial process. Control project 306 can comprise control code intended for execution on an industrial controller (e.g., ladder logic, sequential function charts, structured text, function block diagrams, etc.), device configuration data (e.g., industrial controller configuration files, motor drive configuration files, etc.), visualization applications (e.g., HMI applications, AR/VR content, etc.), or other such control project data. In some scenarios, control code 306 may also comprise engineering documentation for its associated automation system, including engineering drawings (e.g., CAD files), support documents, maintenance plans, or other such documentation. In some scenarios in which the design tools offered by the IDH repository system 202 are used to perform project development, control project 306 can be submitted as ongoing project development input; e.g., as control code submitted to the repository system 202 as a designer is writing the code. Alternatively, users can submit completed control projects to the repository for storage, analysis, and feedback. Both scenarios will be described in more detail herein.

In addition to serving as a cloud-based storage for submitted control project 306, repository system 202 applies a variety of analytics on the submitted control project 306, and generates project recommendations 308 for improving aspect of the submitted control project. This analysis can be based on customer-specific and vendor-specific information contained in a customer repository 324 and a vendor repository 326 maintained on the repository system 202, as well as general industrial expertise stored in a knowledgebase 328.

Repository system 202 can maintain multiple customer repositories 324 designated for respective different end user entities (e.g., equipment or plant owners, industrial enterprises, etc.). Owners of industrial assets can submit and archive project versions 310 in their designated customer repositories 324. Users can also define customized plant standards 314, which can be stored in the customer repository 324 and applied to submitted control projects to ensure that the projects comply with the defined standards. Customer repository 324 can also store digital asset models 312 corresponding to industrial assets in use at the customer facility. These asset models 312 can be used for a variety of purposes, including but not limited to digital simulations of the submitted control project.

The repository system 202 can also analyze control project 306 based on vendor-specific data submitted by equipment or device vendors and stored on one or more vendor repositories 326. Similar to customer repository 324, repository system 202 can maintain multiple vendor repositories 326 assigned to respective different equipment vendors or OEMs. Vendors can submit device profiles 316 or other types of digital models of their equipment or devices for storage in their designated vendor repository 326. These device profiles 316 can be used in connection with building a digital twin of a customer's automation system or plant environment, or to compare a customer's usage of their equipment with defined equipment capacities. Vendors can also submit and store applications 318 or code segments that can be executed in connection with operation of their equipment (e.g., control logic, HMI interface displays, reporting tools, etc.).

The submitted control project 306 can also be analyzed in view of other archived projects 320 submitted by other customers and deemed similar to the submitted project. This analysis may be useful for identifying portions of the submitted control project 306—e.g., code used to program a particular type of industrial machine or procedure—that deviate from more common approaches used by other designers. Knowledgebase 328 can also store a number of industry-specific standards definitions against which the submitted control project 306 can be checked. Other types of information can be stored and managed by the repository system in the various storage designations and used to analyze and optimize submitted control project data, as will be described herein.

Figure 4:
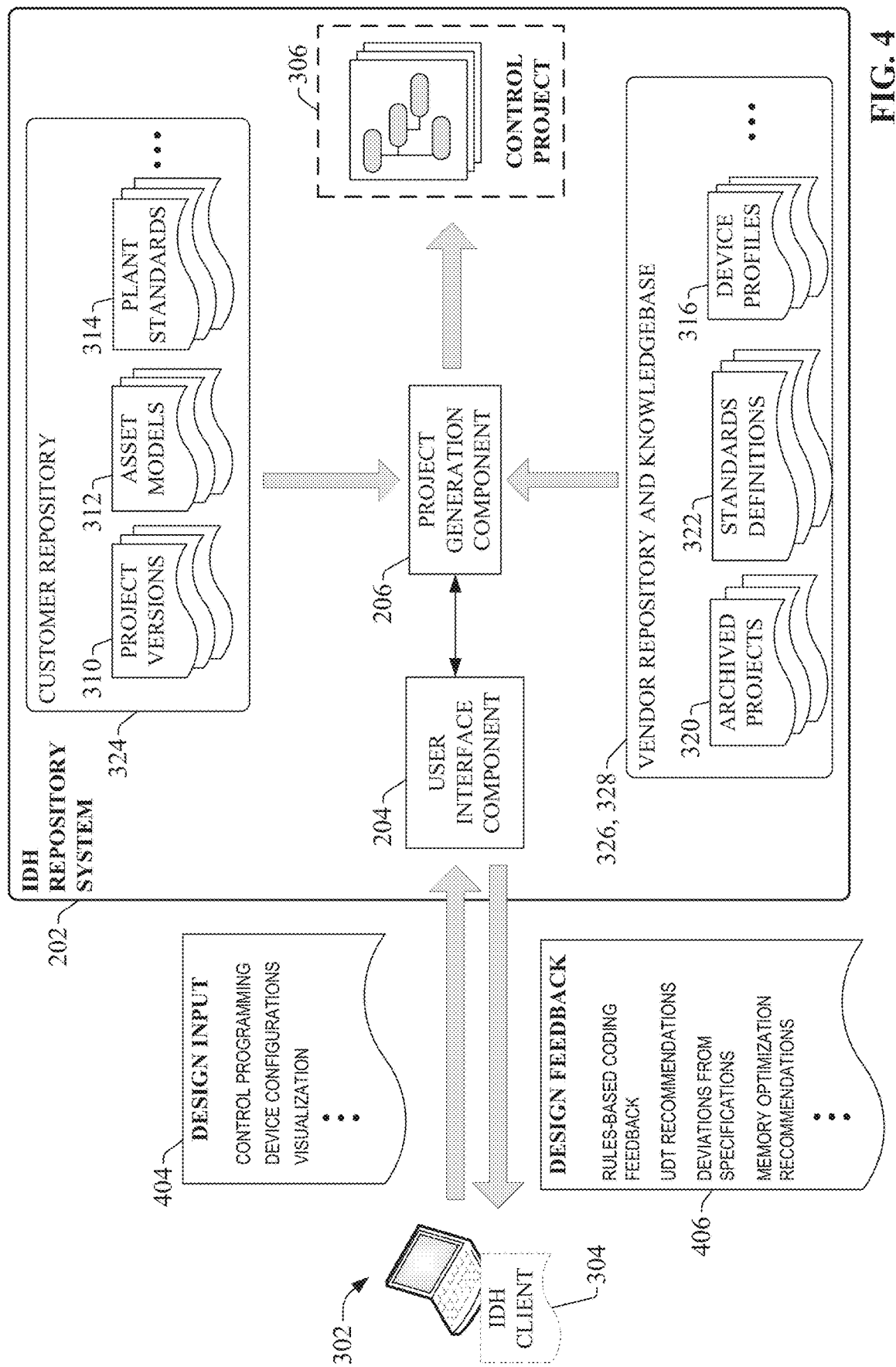
FIG. 4 is a diagram illustrating example data flows associated with creation of a new control project for an automation system being designed using an IDH repository system.

As noted above, control project 306 can be submitted as one or more completed project files for a given industrial control project to be stored and analyzed, or, if the repository system's native project development tools are being used to create a new project, may be submitted as design input during development of the project. FIG. 4 is a diagram illustrating example data flows associated with creation of a new control project 306 for an automation system being designed using repository system 202 according to one or more embodiments. In this example, client device 302 accesses the repository system's project development tools and leverages these tools to create a control project 302 for an automation system being developed. Control project 302 may comprise one or more of industrial controller code, (e.g., control logic, structured text, sequential function charts, etc.), device configuration files or parameter settings, HMI applications defining HMI screens or AR/VR visualizations for visualizing the automation system's operation, or other such aspects of a control project.

Accordingly, to facilitate project development, user interface component 204 can serve development interface displays to the client device 302 that allow a user to submit design input 404 to the repository system 202 in various supported formats, including but not limited to control programming for execution on an industrial controller, device configuration settings to be downloaded to respective industrial devices (e.g., motor drives, sensors, industrial controllers, etc.) to facilitate configuration of those devices, HMI screen development data, or other such design input 404. Based on this design input 404, project generation component 206 generates a control project 306 comprising one or more of compiled controller code, device configuration data, HMI application files, or other such executable control project data that can be deployed and executed on the appropriate industrial devices to carry out the programmed control functions.

In some embodiments, the repository system 202 can assist the developer in devising a hybrid project development approach, such that design functions are split between a local workstation and the cloud-based design services. In this regard, the repository system 202 can assist the designer to delineate which portions of project development are executed locally and which portions are executed on the cloud platform.

Also, during development of the control project 306, project generation component 206 can generate design feedback 406 intended to assist the developer in connection with developing and optimizing the control project 306, and this design feedback 406 can be rendered by the user interface component 204 as real-time feedback to the designer. This design feedback 406 can be generated based on the analysis of the design input 404 itself, as well as information stored in the customer repository 324, vendor repository 326, and knowledgebase 328.

For example, as the designer is entering, as design input 404, control code to be compiled and executed on an industrial controller, project generation component 206 can perform code analysis on the code and provide recommendations, notifications, or predictions based on the analysis relative to a variety of code or project quality metrics. This analysis can include determining whether the control code conforms to the engineering standards and practices used at the plant facility for which the code is being developed. To aid in this analysis, engineers at the plant facility can submit control code standards definitions defining the coding standards that all control code is expected to adhere to before being permitted to execute within the plant facility. These coding standards can be stored in the customer's repository 324 as plant standards 314, and can be referenced by the project generation component 206 as the designer submits design input 404 to determine whether the submitted control code is in conformance with plant standards.

Plant standards 314 can define coding standards both in terms of preferred control behaviors (e.g., preferred control sequences to be used or interlocks that must be recognized when carrying out a particular type of control action, preferred maximum or minimum control setpoints for particular machine operations, etc.) as well as in terms of preferred code formatting. Plant standards 314 may also define preferred parameters or configurations for particular types of devices (e.g., motor drives, network infrastructure devices, etc.), and project generation component 206 can monitor the submitted design input 404 during development to ensure that any device configurations submitted by the designer conform to the defined standards. Upon determining, based on this assessment, that the designer has entered a non-compliant device configuration, project generation component 206 can generate design feedback notifying the user of the deviation and indicating the allowable configuration parameters.

Plant standards 314 may also include project-specific standards, including functional specifications or safety validation requirements. Project generation component 206 can monitor the design input 404 with reference to the functional project requirements defined by the plant standards 314 and, upon determining that any portion of the submitted design input 404 deviates from the defined functional specifications or safety validation requirements, generate design feedback notifying the user of the deviation and offering recommendations as to how the deviant portion of the control project can be brought within compliance. Plant standards 314 can define functional specifications in terms of manufacturing functions to be carried out, preferred equipment vendors, equipment to be used, product output requirements, energy consumption requirements, network utilization requirements, or other such specifications. Depending on the functional specifications set forth by the plant standards 314, project generation component 206 can infer relevant properties of the control project based on the design input 404 and notify the user if any aspect of the project deviates from these standards. For example, if the functional specification dictates that only motor drives from an indicated preferred vendor are to be used for the new installation, project generation component 206 may infer from the design input 404 (e.g., from the I/O configuration of an industrial controller, or from device configuration data included in the design input 404) that devices from a non-approved vendor are being included in the control project design, and notify the user that other devices from an approved vendor must be substituted.

In some embodiments, project generation component 206 can also compare control code submitted as part of the design input 404 with previously submitted control code included in archived project versions 310 for the same control project or different control projects developed by the same customer. Based on analysis of other control code submitted by the customer and archived in the customer repository 324, project generation component 206 can learn or infer typical coding styles or design approaches used by that customer. This can include, for example, code indentation preferences, preferences regarding the use of call statements, rung commenting standards, variable or I/O naming standards, or other such preferred programming characteristics. In addition to control coding standards, the project generation component 206 can also identify the customer's preferred manner of programming certain control operations. For example, project generation component 206 may identify, based on analysis of archived project versions 310, that the customer uses a particular control sequence in order to move material from a source container to a tank, or that the customer typically associates a particular control operation with a set of interlocks that must be satisfied before the control operation can be performed.

Based on these learned customer programming preferences, the project generation component 206 can identify whether the control programming being submitted as part of design input 404 deviates from either the plant's preferred coding practices or the plant's preferred manner of controlling certain industrial operations based on comparison with the project versions 310, and generate design feedback 406 notifying of these deviations and recommending alternative control coding that will bring the current project into conformity with previous design strategies. This feedback 406 may include, for example, a recommendation to add one or more interlocks to the control programming for a particular control operation, a recommendation to re-order a sequence of operations for control of a particular type of machine, a recommendation to rename a variable or an I/O point to conform with the plant's preferred nomenclature, a recommendation to add or revise a rung comment, a recommendation to change an indentation for a portion of control code, a recommendation to replace repeated instances of code with a CALL statement, or other such feedback.

Project generation component 206 can also reference vendor-specific equipment or device data in one or more vendor repositories 326 to predict whether the user's submitted design input 404 will cause equipment integration or compatibility issues. This determination can be based, for example, on device profiles 316 submitted by the equipment vendor for access by the project generation component 206. Each device profiles 316 may comprise digital specification data for a given device, and may also record known compatibility issues for the device. Using this information, project generation component 206 can assess the submitted design input 404 to determine whether any portion of the submitted control programming or device configurations will result in a performance or integration issue given known limitations of one or more devices. This assessment may also consider inferred interactions between sets of devices that the user is designing for collaborative operation. For example, if the design input 404 suggests that the designer is intending to configure two non-compatible devices for collaborative operation (as determined based on known compatibility issues recorded in the device profiles 316), project generation component 206 can generate design feedback 406 indicating the two non-compatible devices.

The analysis applied by the project generation component 206 can also identify improper or non-optimal coding practices within submitted control code. This determination can be based in part on preferred coding practices defined in the standards definitions 322 maintained in the repository system's knowledgebase 328. Coding concerns that can be identified by the project generation component 206 can include, but are not limited to, excessive levels of nesting, excessive repeated code, improper code indentations, etc. In response to detecting such coding issues within the user's submitted code, the project generation component 206 can provide design feedback recommending alternative programming approaches that would bring the control code into conformance with preferred coding standards (e.g. a recommendation to employ case statements to eliminate excessive ladder logic).

Project generation component 206 may also identify modifications or substitutions that can be made within the control project 306 that may improve memory or network utilization associated with execution of the control project 306. This may include, for example, identifying alternative control code programming—or making another modification to the control project 306—that may reduce the processing load on an industrial controller without changing the intended control functions. In another example, the project generation component 206 may determine that utilizing a currently unused function of a device (e.g., an operating mode or a configuration parameter setting), or substituting a device currently used in the control project 306 with a different device model, may reduce energy consumption or network bandwidth utilization.

Figure 5:
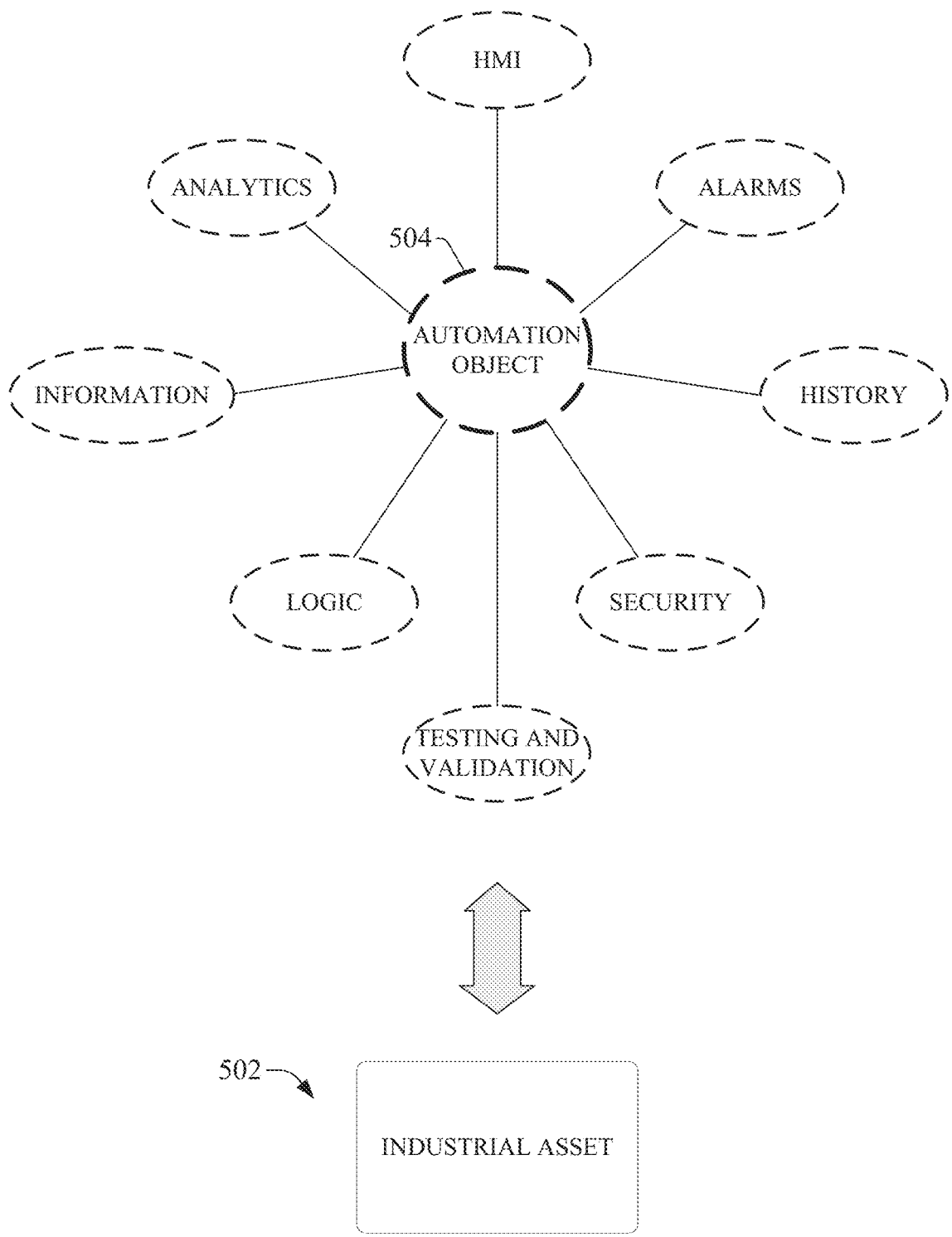
FIG. 5 is a diagram illustrating several example automation object properties that can be leveraged by an IDH repository system in connection with building, deploying, and executing a control project.

To support enhanced development capabilities, some embodiments of IDH repository system 202 can support control programming based on an object-based data model rather than a tag-based architecture. Automation objects can serve as the building block for this object-based development architecture. FIG. 5 is a diagram illustrating several example automation object properties that can be leveraged by the repository system 202 in connection with building, deploying, and executing a control project 306. Automation objects 504 can be created and augmented during design, integrated into larger data models, and consumed during runtime. These automation objects 504 provide a common data structure across the repository system 202 and can be stored in an object library (e.g., part of memory 226) for reuse. The object library can store predefined automation objects 504 representing various classifications of real-world industrial assets 502, including but not limited to pumps, tanks, values, motors, motor drives (e.g., variable frequency drives), industrial robots, actuators (e.g., pneumatic or hydraulic actuators), or other such assets. Automation objects 504 can represent elements at substantially any level of an industrial enterprise, including individual devices, machines made up of many industrial devices and components (some of which may be associated with their own automation objects 504), and entire production lines or process control systems.

An automation object 504 for a given type of industrial asset can encode such aspects as 2D or 3D visualizations, alarms, control coding (e.g., logic or other type of control programming), analytics, startup procedures, testing protocols and scripts, validation procedures and reports, simulations, schematics, security protocols, and other such properties associated with the industrial asset 502 represented by the object 504. Automation objects 504 can also be geo-tagged with location information identifying the location of the associated asset. During runtime of the control project 306, the automation object 504 corresponding to a given real-world asset 502 can also record status or operational history data for the asset. In general, automation objects 504 serve as programmatic representations of their corresponding industrial assets 502, and can be incorporated into a control project 306 as elements of control code, a 2D or 3D visualization, a knowledgebase or maintenance guidance system for the industrial assets, or other such aspects.

Some embodiments of project analysis component 210 can also predict network traffic or load statistics based on the device configuration information obtained from analysis of the control project 306 and generate network configuration recommendations based on these predictions. This analysis can be based on a comparison of the customer's network configuration with known or recommended network configurations. Project analysis component 210 may also generate a network risk report indicating risks of network failure as a result of implementing the proposed control design.

Completed control projects 306—either developed using the repository system's project editing tools (as described above in connection with FIG. 4) or using separate control project development platforms (e.g., ladder logic development platforms, HMI application development platforms, device configuration applications, etc.)— can be submitted to the repository system 202 for analysis, archival, or upgrade purposes, as depicted in FIG. 3. In this regard, the IDH repository system 202 serves as a secure and intelligent industrial control project repository open to any number of participating industrial customers, which offers both secure archival of control projects 306 as well as analysis of these projects 306 for the purposes of generating project recommendations 308 intended to optimize the control design, or to guide the designer to previously unknown and unused device features that, if utilized, may improve performance of the control project.

Figure 6:
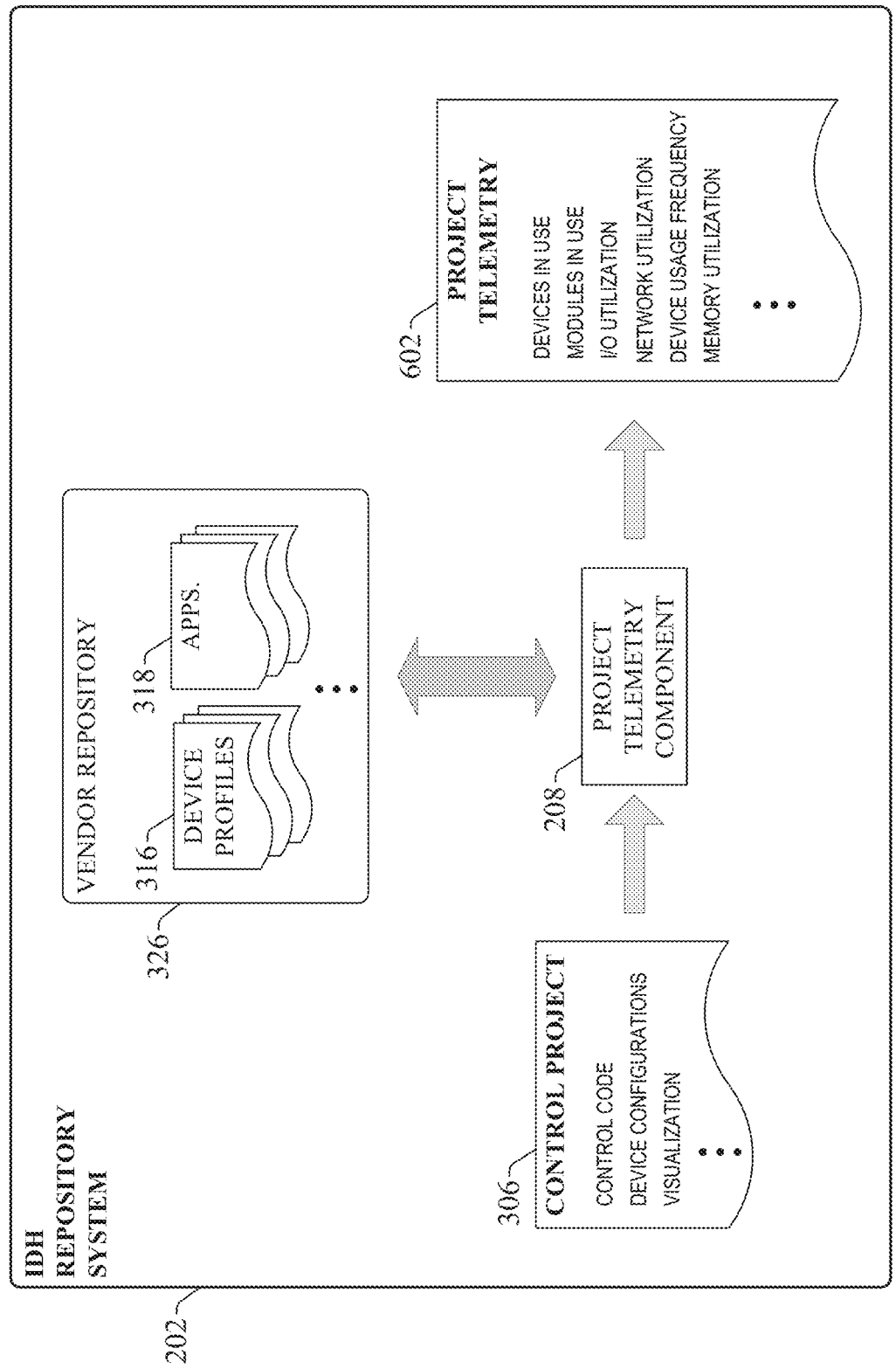
FIG. 6 is a diagram illustrating extraction of project telemetry data from a control project submitted to an IDH repository system.

To facilitate intelligent analysis of a submitted control project 306, IDH repository system 202 can include a project telemetry component 208 that generates project telemetry data for a submitted control project 306, which can offer insights into both the control project itself as well as the equipment and device topology of the automation system for which the control project 306 is being designed. FIG. 6 is a diagram illustrating extraction of project telemetry data 602 from a control project 306 submitted to the repository system 202. Based on analysis of the control project 306 project telemetry component 208 can determine or infer characteristics of the control project itself, information regarding the devices or equipment that makes up automation system to be monitored and controlled by the control projects 306, predictions regarding performance or resource utilization of the controlled system, the control design's estimated impacts on device lifecycle for one or more devices, or other such project metrics.

For example, based on analysis of an industrial controller program file—which may include control code, I/O configuration data, and networking configuration data for the an industrial controller—the project telemetry component 208 may identify input or output devices connected to the industrial controller (e.g., based on examination of the I/O configuration or the control code itself), and record an inventory of these devices in the project telemetry data 602. Similar analysis can be used to determine I/O or control modules configured for use, as well as information regarding how the controller's I/O is being utilized. Project telemetry component 208 can also record inferred functional or topological relationships between any two or more of the devices or equipment identified as being part of the automation system. Project telemetry component 208 can also estimate a total amount of network bandwidth or energy that the automation system is expected to consume. To yield further insights into how the devices that make up the control system are being used, project telemetry data 602 can also record which subset of the available features of a device are currently being used by the control project 306.

In addition to metrics for the automation system to be controlled, the project telemetry component 208 can also estimate performance metrics for the control code itself, such as an estimated amount of memory or processing power required to execute aspects of the control project 306.

In some cases, project telemetry component 208 can enhance the project telemetry data 602 generated for the control project 306 by referencing vendor-specific device information stored in device profiles 316 on the vendor repository 326. For example, the project telemetry component 208 may identify, based on analysis of the control project 306, that a particular device model (e.g., an I/O module, a network infrastructure device, a motor drive, a servo, an actuator, etc.) is being used as a component of the automation system. Based on identification of this device, project telemetry component 208 can access the vendor repository 326 corresponding to the vendor of the device, determine whether a device profile is available for the device, and, if so, retrieve functional specification data for the device from the device profile 316 for inclusion in the project telemetry data 602. This functional specification data, which depends on the type of device, can include such information as the device's available I/O, available configuration parameters or functionalities, available memory or processing capacity, lifecycle information, response times, physical dimensions, rated power, networking capabilities, operational limitations (e.g., environmental requirements, such as ambient temperatures for which the device is rated), or other such supplemental device information.

Figure 7:
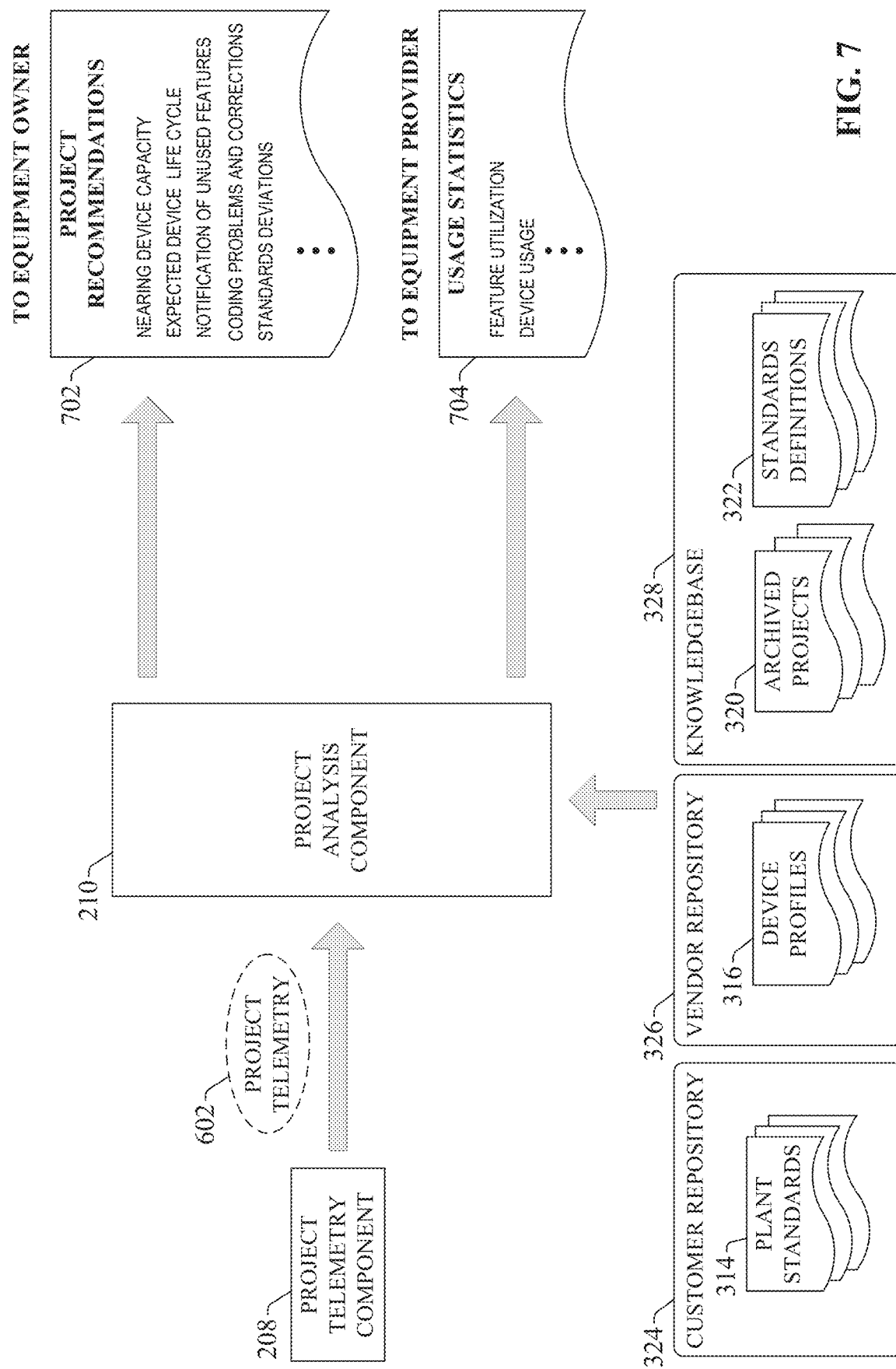
FIG. 7 is a diagram illustrating generation of project recommendations based on analysis of extracted project telemetry data.

Once project telemetry data 602 has been extracted for the control project 306, the repository system's project analysis component 210 can generate recommendations or notifications relevant to the project design based on analysis of this project telemetry as well as encoded industry expertise. FIG. 7 is a diagram illustrating generation of project recommendations 702 based on analysis of the extracted project telemetry data 602. By analyzing project telemetry data 602, project analysis component 210 can ascertain how the customer's industrial hardware and software assets are being used and generate recommendations or notifications based on this assessment. This can include determining whether the proposed control project—either due to control sequences defined by the control programming or the configuration parameters set for one or more industrial devices—will cause hardware or software used in the control project to operate near or above their rated operating thresholds. For example, based on the control project's I/O utilization, as recorded in the project telemetry data 602, as well as knowledge of the I/O capacity of devices used in the control project (which may be determined based on specification data for those devices as record in device profiles 316), project analysis component 210 may generate a notification that the proposed control design will cause one or more control devices (e.g., industrial controllers or I/O modules) to near or exceed its maximum I/O capacity. Based on this assessment, the project analysis component 210 may further recommend an alternative control device having a higher I/O capacity than that currently proposed in the control project in order to increase the number of spare I/O points for future expansion.

Project analysis component 210 may also estimate a degree of device utilization over time based on analysis of the project telemetry data 602 and cross-reference this information with lifecycle information for the device recorded in the device's profile 316, and generate a notification indicating an expected life cycle or time-to-failure for the device if used as proposed in the control project. If an equivalent device having a longer expected lifecycle is available, project analysis component 210 may also generate a recommendation to replace the currently proposed device with the equivalent. Alternatively, the project analysis component 210 may recommend a modification to the control project that may extend the lifespan of the device (e.g., by reducing the operating frequency of the device without otherwise impacting the control outcomes).

In some embodiments, project analysis component 210 may also identify unused features of a device which, if utilized, may improve one or more operating metrics of the control project. These may be features of the device (e.g., configuration parameters, latent functions that are inactive by default but can be activated or invoked, etc.) that are available but are unknown to the designer. In an example scenario, project analysis component 210 may discover available features of a device based on the functional specifications recorded in the device's profile 316, and determine whether any unused features may be relevant to an aspect of the control project 306, or may improve a performance metric for the control project 306. For example, the project analysis component 210 may determine that invoking a currently unused operating mode of a device may reduce the memory footprint or network bandwidth usage of the device, may improve the automation system's product throughput, may reduce energy or material consumption of the project as a whole, may reduce product waste, or may unlock another unforeseen improvement in the project's operation. If such possible design improvements are identified, user interface component 204 can send a notification to the designer (or another user entity associated with the customer) recommending the design modification. In an example scenario, based on submitted device configuration files as part of control project 306, project analysis component 210 may determine that an unused feature of a drive (e.g., regenerative braking) may reduce overall power consumption, and generate a notification identifying the drive and indicating the unused feature. The notification may also offer a recommendation regarding when, during the control sequence, the feature should be invoked in order to obtain the predicted benefit.

Project analysis component 210 may also determine whether any aspect of the control project 306 deviates from industry or plant standards. This can be based on a comparison between the project telemetry 602 and industry standards defined in the standards definitions 322 (stored in knowledgebase 328) or in-house standards defined in the plant standards 314 stored in the customer repository 324. In the case of industry standards, the particular set of standards against which the control project 306 is compared may be a function of the industrial vertical (e.g., automotive, pharmaceutical, food and drug, oil and gas, etc.) in which the control project 306 will operate, since some types of industries may require adherence to a vertical-specific set of control standards or requirements. Accordingly, the knowledgebase 328 may classify standards definitions 322 according to industrial vertical, allowing project analysis component 210 to select an appropriate set of standards to be applied to the control project 306. Standards definitions 322 may define such industry standards as a required amount of unused I/O that must be reserved as spare capacity, an emissions or energy consumption requirement, a safety integrity level (SIL) requirement, interlocks or permissives that should be associated with a given type of control operation (e.g., tying a "valve open" command to the fill level of a tank, preventing a machine start command until specified safety interlocks are satisfied) or other such standards.

Example in-house standards that can be recorded in the customer's plant standards 314 and applied to the control project 306 can include, but are not limited to, control coding standards (as described above in connection with FIG. 4), preferred vendors whose devices are approved for use within the plant, safety interlocks or permissives to be associated with certain control functions, or other such standards.

Project analysis component 210 may also perform any of the project analytics, and generate any of the design feedback 406, described above as being carried out by the project generation component 206. Some project analysis results may also trigger expert support review, such that the project analysis component 210 initiates remote review of the project, contingent on the designer's permission, by a technical support entity.

Since the control project analysis carried out by the project telemetry component 208 and project analysis component 210 can identify or infer devices and networks that will be used by the control project 306, project analysis component 210 can also generate an inventory of the devices or industrial assets used by the customer's project. Repository system 202 can store this asset inventory in the customer repository 324 associated with the owner of the control project 306. Moreover, if any of the discovered devices or industrial assets have associated digital device profiles 316 made available by the vendors of the assets and stored on the vendor repository 326, repository system 202 can retrieve these device profiles 316 from the vendor repository 326 and store the profiles 316 in the customer repository as asset models 312 corresponding to the devices. In this regard, the device profiles 316 may represent generic digital representations of their represented assets, and the project analysis component 210 may convert these generic device profiles 316 to customized asset models 312 representing the customer's uniquely configured assets based on the project telemetry data 602. A device profile 316 for a given industrial device (e.g., an industrial controller, a motor drive, a safety device, etc.) can be customized, for example, by applying the designer's particular configuration parameters for that device (as obtained from the project telemetry data 602) to the device profile 316 to yield the customized asset model 312 for the device. These asset models 312 can be used as the basis for a digital twin of the automation system, which can be used to simulate and test the control project 306 as will be described in more detail herein.

Results of the analysis performed on the project telemetry data 602 can also be formatted and filtered for use by equipment providers (e.g., equipment vendors, OEMs, etc.) who participate in the repository system ecosystem, and this information can be made available to equipment providers as equipment usage statistics 704. For example, for every equipment vendor whose equipment is being used in the control project 306, the project analysis component 210 can provide data to the vendor indicating which of their devices are being used, as well as which features of those devices are being used. This data can be provided to the vendor in a manner that anonymizes the end customer and prevents the vendor from being able to view the customer's proprietary information (e.g., recipe data, production statistics, etc.). In general, the repository system 202 protects a customer's proprietary data while affording enough access to provide the services. The user interface component 204 can allow the user to easily control how proprietary data is exposed to or hidden from outside entities who are also participating in the IDH platform.

For a given equipment provider, the user interface component 204 can compile these device or equipment statistics from multiple control projects 306 submitted by multiple different customers and present this aggregated equipment usage and feature utilization information in any suitable presentation format. For example, information regarding which of the equipment provider's devices or assets are being used can be presented as numbers of each asset in use at customer sites, geographic breakdowns indicating where the assets are being used, charts indicating relative popularities of the vendor's product line, etc. Similar presentations can be used to convey which features (e.g., operating modes, configuration parameters, etc.) of each of the vendor's products are being used, or how closely their products are being utilized to their functional capacities, as determined from aggregated project telemetry data 602 collected from multiple end customers using the vendor's products. Equipment providers can use these statistics 704 to make decisions regarding whether to discontinue a product due to lack of popularity; to identify potentially useful product features that are being underutilized by their customers and therefore should be more heavily promoted; to decide whether to increase or decrease memory, processing, or I/O resources of certain products based on a degree to which these resources are being used by the customers; or to make other informed decisions regarding product design and promotion.

While some equipment usage statistics 704 may be presented to the equipment providers in a manner that anonymizes the end customers (e.g., for the purposes of global product usage analysis), selected other such statistics 704 may be presented on a per-customer basis based on service or licensing agreements between the equipment provider and their customer. For example, some equipment providers, such as OEMs, may offer the use of their equipment as a subscription service in which the customer purchases a license for a specified degree of usage of the equipment (e.g., a specified number of operating cycles per month, a limited subset of available equipment features, etc.). In such scenarios, project analysis component 210 may determine an estimated frequency of usage of the provider's equipment based on analysis of the project telemetry data 602, and make this information available to the equipment provider for the purposes of license enforcement.

According to another type of analysis that can be applied to the project telemetry data 602, project analysis component 210 can compare the control project 306 or its extracted project telemetry data 602 with similar archived projects 320 submitted by other end customers, and identify aspects of the submitted control project 306 that deviate significantly from corresponding aspects of the similar archived projects 320. User interface component 204 can then render, as a project recommendation 702, a notification indicating the deviant aspects of the control project 306 and recommending a project modification that would bring the control project 306 in line with common practice. In this way, the repository system 202 can leverage collective industry expertise or common practice to provide recommendations regarding best practices relative to a submitted control project. Aspects of the submitted control project 306 that can be compared in this manner can include, but are not limited to, interlock designs for a given type of control operation, device configuration parameters (e.g., motor drive settings, network infrastructure device settings, safety device settings, etc.), control setpoints, orders of operations or timings for a given type of control operation or sequence, or other such project aspects.

Figure 8:
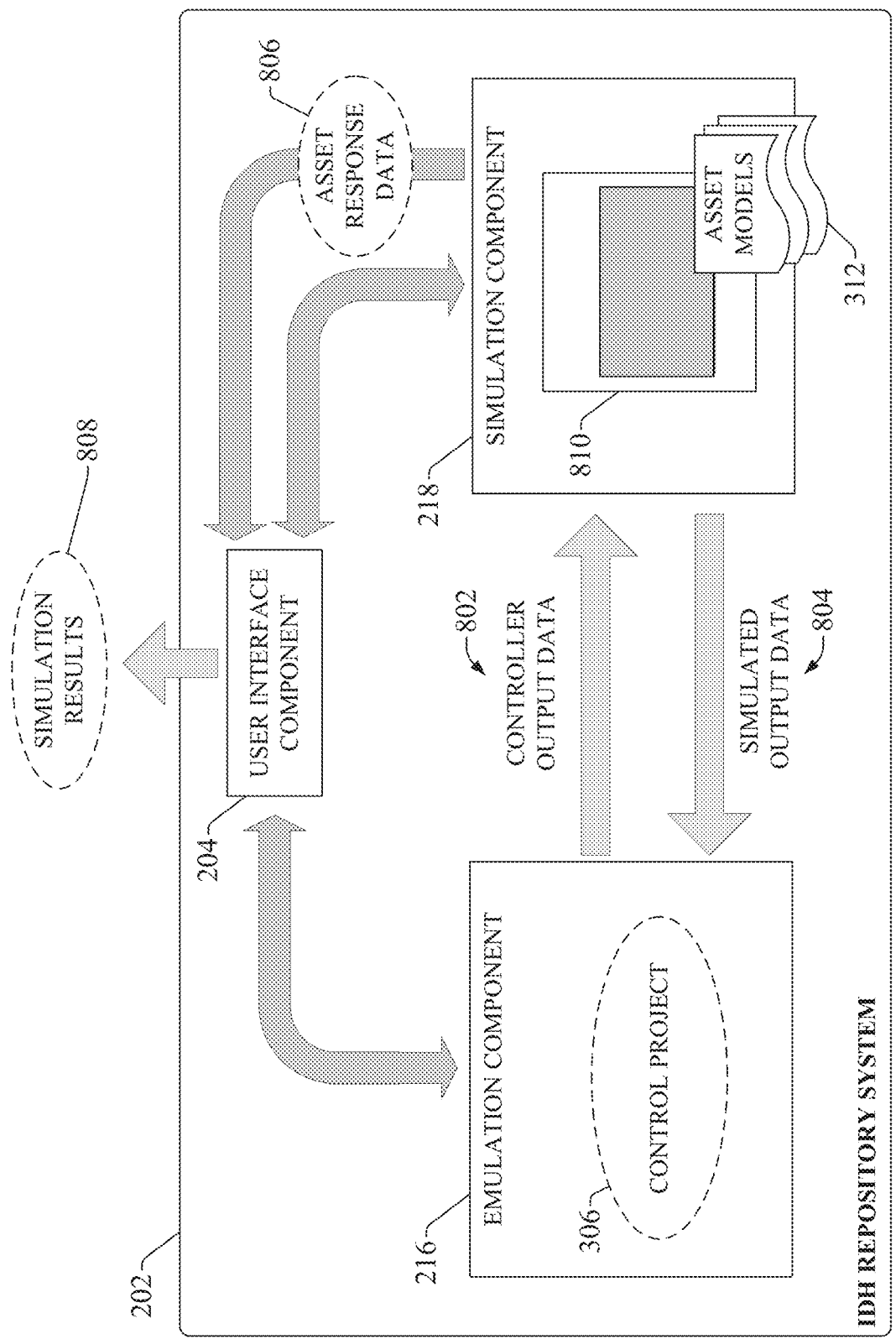
FIG. 8 is a diagram illustrating generation of project recommendations based on analysis of extracted project telemetry data.

Some embodiments of the repository system 202 can also simulate one or more aspects of the submitted control project 306 to predict whether the control project 306 will yield a desired outcome relative to one or more controlled machines. This allows the control project 306 to be pretested prior to execution on a physical machine. FIG. 8 is a diagram illustrating simulation of a control project 306 by the IDH repository system 202. In this example, the repository system's emulation component 216 acts as an industrial controller emulator to execute control programming defined as part of the control project 306 against digital twin 810 or other type of virtualization of the automation system for which the control project 306 is being developed and tested. In some embodiments, the simulation component 218, which builds and simulates the digital twin 810, can create the digital twin 810 based in part on the asset models 312 representing industrial devices or assets that make up the automation system. As noted above, these asset models 312 can be maintained on the customer repository 324, and may comprise device profiles 316 obtained from the vendor repository 326 and customized based on configuration data obtained from the project analysis. Using these asset models 312, and the functional and/or topological relationships between the industrial assets represented by the asset models 312 as inferred from analysis of the control project 306, simulation component 218 can generate a digital twin 810 of the automation system against which the control project 306 can be simulated and tested.

Simulation component 218 can leverage automation and mechanical characteristics modeled by the digital twin 810 to simulate various aspects of a physical automation system to be monitored and regulated by the control project 306. To this end, simulation component 218 can virtually interface the control project 306 with the digital twin 810 to facilitate exchange of simulated I/O data between the control project 306 (e.g., control code included in the control project 306) and digital twin 810, thereby simulating real-world control. Simulation component 218 generates digital and analog I/O values representing, for example, sensor outputs, metering outputs, or other plant data analogous to the data expected to be generated by the physical system based on the static and dynamic characteristics of the physical system modeled by the digital twin 810. This simulated output data 804 is provided to the emulation component 216, which receives this data 804 as one or more virtual physical inputs. Control project 306 processes these inputs according to the user-defined control code defined in the project 306 and generates digital and/or analog controller output data 802 based on the processing. This output data 802 represents the physical outputs that would be generated by an industrial controller or other type of control device executing the control code and transmitted to the hardwired field devices comprising the automation system (e.g., PID loop control outputs, solenoid energizing outputs, motor control outputs, actuator control outputs, robot control outputs, etc.). The controller output data 802 is provided to the appropriate input points of the digital twin 810, which updates the simulated output data 804 accordingly.

In addition to generating simulated output data 804, simulation component 218 can also generate asset response data 806 based on analysis of the simulated data exchange and expected behaviors of the modeled industrial assets in response to the simulated controller output data 802. For example, based on the automation and mechanical characteristics of the industrial assets modeled in the digital twin 810, simulation component 218 can predict expected behaviors of the modeled industrial assets, as well as behaviors of products being manufactured by the assets, in response to the controller output data 802, and convey this predicted behavior as asset response data 806. Example behaviors represented by asset response data 806 can include, but are not limited to, movement of product through the industrial assets (including speeds, accelerations, locations, lags, etc.), flow rates of fluids through the assets, expected energy consumption by the assets, an expected rate of degradation of mechanical components of the assets (based in part on coefficient of friction information defined in the asset models 312), expected forces applied to respective components of the assets during operation, or other such behaviors.

User interface component 204 can generate and render simulation results 808 on a client device based on performance results of the simulation. These simulation results 808 can include simulated operating statistics for the automation system (e.g., product throughput rates, expected machine downtime frequencies, energy consumption, network traffic, expected machine or device lifecycle, etc.). In some embodiments, asset response data 806 can be provided to the project analysis component 210, which can determine whether any of the simulated asset responses deviate from acceptable or expected ranges, which may be defined in the functional specifications stored on the customer repository 324. Based on results of this assessment, user interface component 204 can notify the user of any predicted deviations from the expected operating ranges and render recommendations regarding modifications to the control project 306 that may bring expected performance within defined tolerances.

Figure 9:
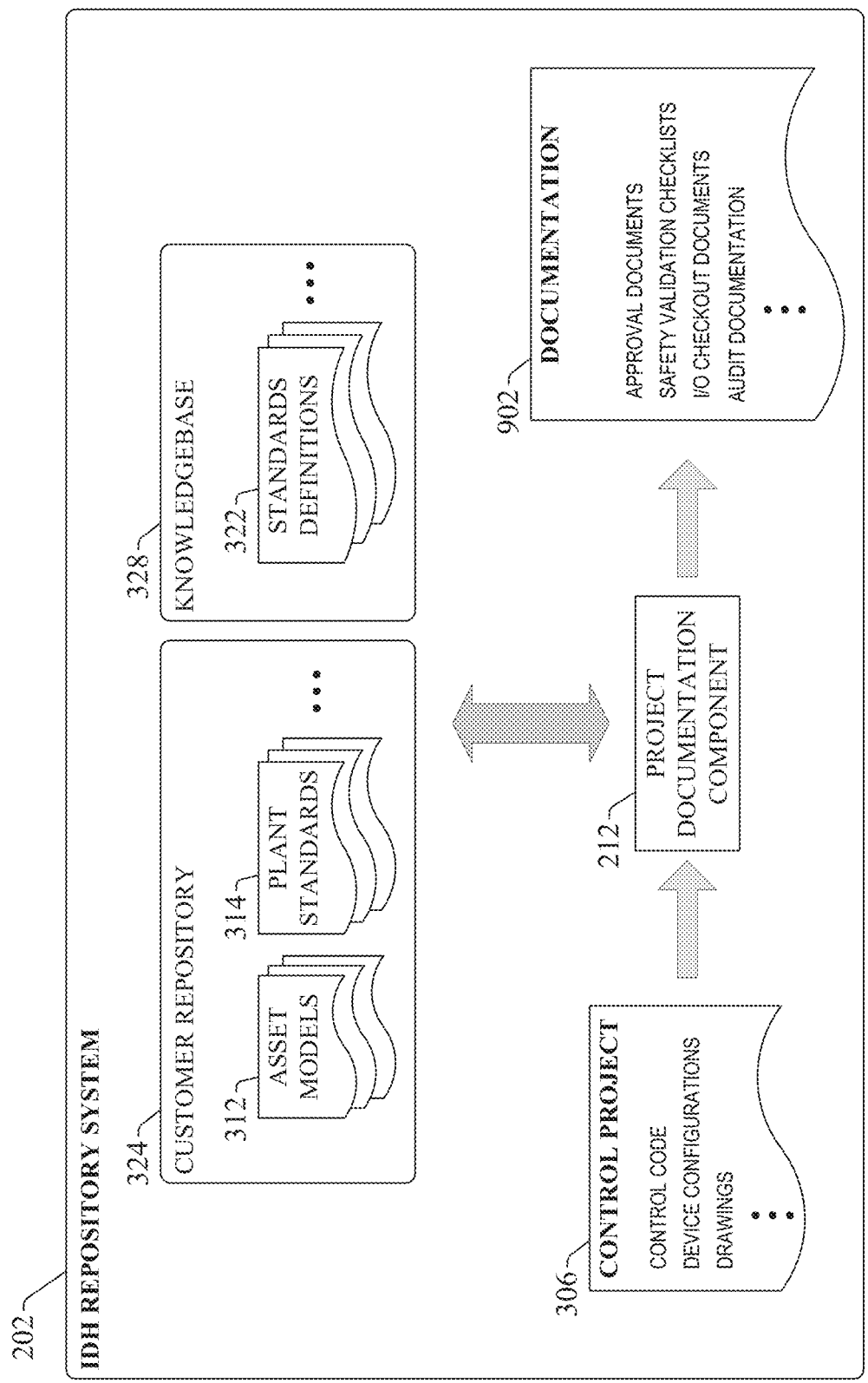
FIG. 9 is a diagram illustrating generation of handoff documentation by an IDH repository system.

At the end of a new design cycle, the repository system 202 can also generate project handoff and validation documents for the new control project. FIG. 9 is a diagram illustrating generation of handoff documentation 902 by the IDH repository system 202. Based on analysis of the completed control project 306, the repository system's project documentation component 212 can generate a variety of project documentation 902, including but not limited to approval documents, safety validation checklists, I/O checkout documents, and audit trails. At least some of this documentation 902 can be generated based on information stored in the customer repository 324. For example, project documentation component 212 may generate I/O checkout documents for the control project based on knowledge of the devices connected to the control system I/O— as determined from the control project 306—as well as information about these devices obtained from the asset models 312 corresponding to these devices. Similarly, safety validation checklists can be generated based on asset-specific safety requirements defined in the asset models 312. Some documentation 902 may also be generated based on in-house approval requirements defined in the plant standards 314. These approval requirements may specify, for example, the personnel who must sign their approval for various aspects of the control project.

Some documentation 212 may also be generated based on vertical-specific safety or auditing standards defined in the standards definitions 322 of the knowledgebase 328. In this regard, some industrial verticals may require compliance with regulations dictating how electronic records relating to engineering and operation of an automation system are collected and stored, how electronic signatures are obtained for the automation system, what types of documentation must be collected for auditing purposes, etc. For example, plant facilities operating within the food and drug industry are required to maintain records in compliance with Title 21 CFR Part 11. Accordingly, project documentation component 212 can identify types of project documentation required for the control project 306 based on the industrial vertical for which the project 306 is designed and the standards definitions 322 defining the documentation requirements for that vertical.

Figure 10:
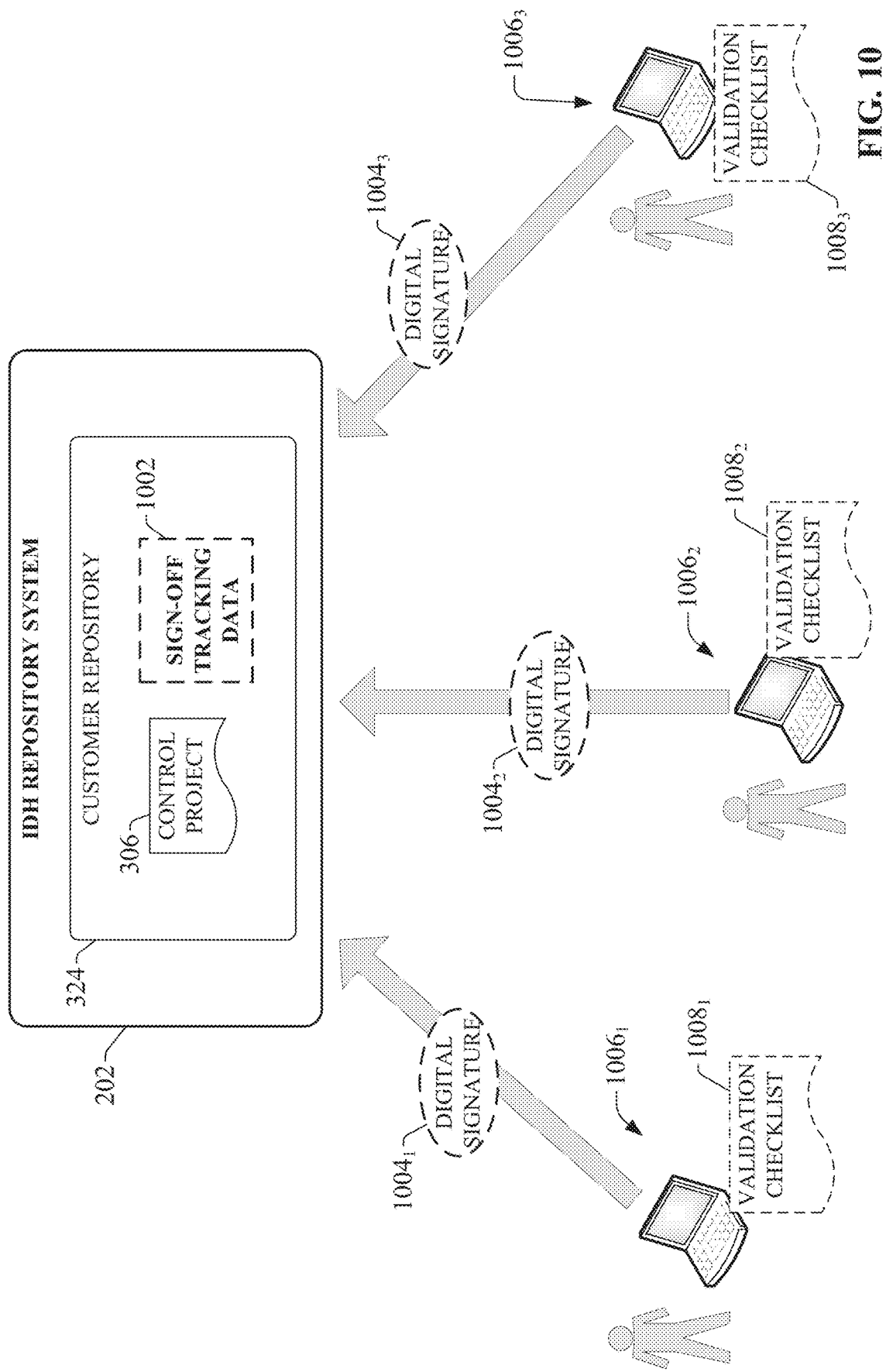
FIG. 10 is a diagram illustrating collection of digital signatures by an IDH repository system.

In some embodiments, the IDH repository system 202 can also manage digital or electronic signatures that are tied to the validation checklists generated by the project documentation component 212. FIG. 10 is a diagram illustrating collection of digital signatures by the repository system 202 according to one or more embodiments. In this example, digital validation checklists 1008 has been delivered to client devices 1006 associated with personnel who are required to sign off on aspects of the control project 302. The validation checklists are interactive, such that each user can submit a digital signature 1004 for respective items on the validation checklist 1008 via interaction with the checklist. At the repository system 202, the digital signatures 1004 are received from the client devices, and project documentation component 212 maintains a record of the received signatures 1004 as sign-off tracking data 1002, which tracks which signatures 1004 have been received for each item on the validation checklist, and from whom the signatures 1004 have been received. This sign-off tracking data 1002 can subsequently be referenced for auditing purposes. In some embodiments, the repository system can be configured to deploy components of control project 306 (e.g., control code, HMI visualization applications, device configurations, etc.) to their corresponding field devices only after all necessary signatures 1004 indicating approval of those components have been received.

Figure 11:
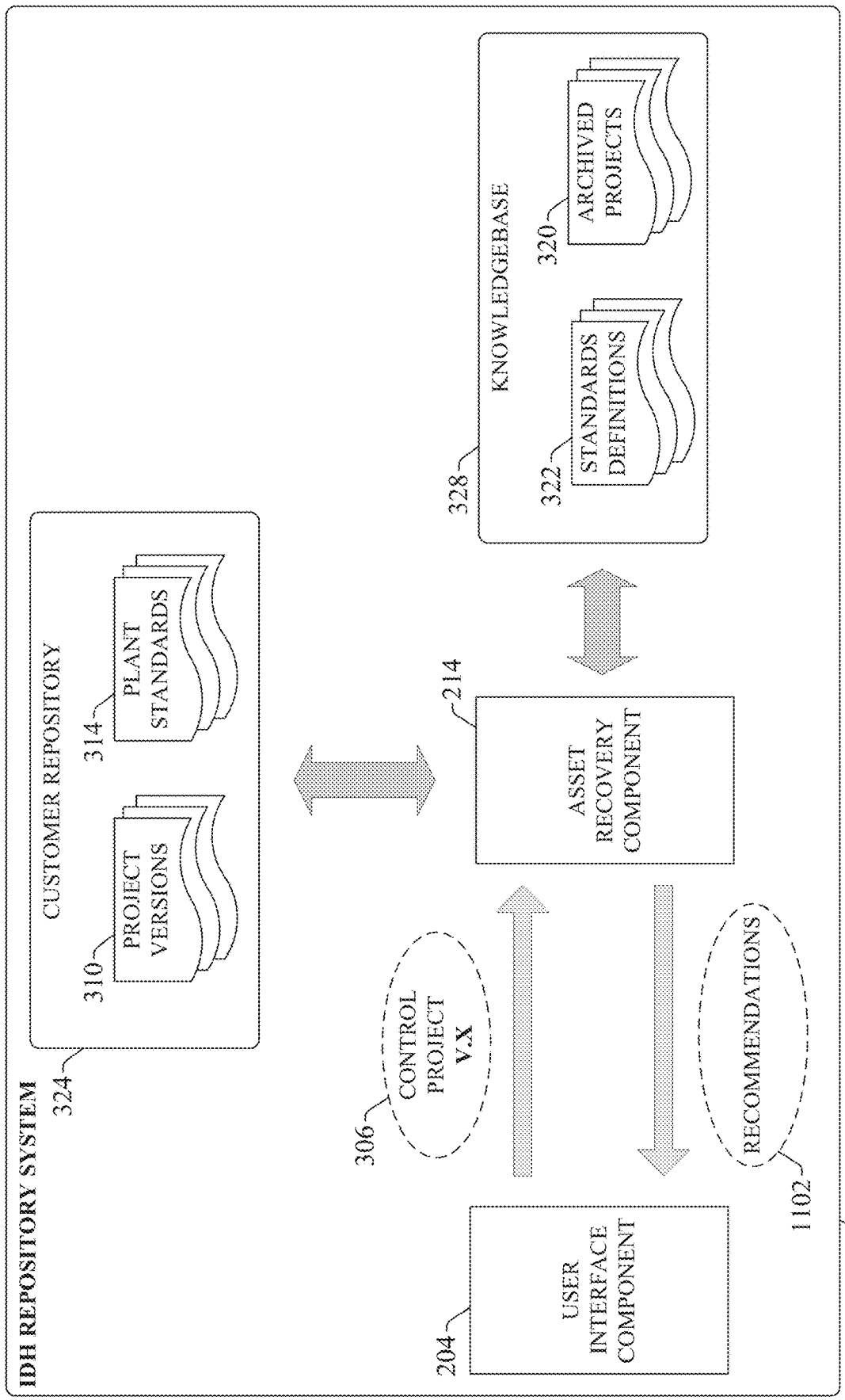
FIG. 11 is a diagram illustrating submission of a new version of a control project for archival with older project versions.

IDH repository system 202 can also be used to archive past and current versions of the control project 306 and perform related version control and analysis functions. FIG. 11 is a diagram illustrating submission of a new version of control project 306 for archival with older project versions 310. In this example, the customer repository 324 archives past and current versions of the control project 306 as project versions 310. New versions of the control project 306 may be the result of modification to the control code, device firmware upgrades, additions to the control project 306 to accommodate new equipment, or other such changes to the control project. Archiving current and past versions of the control project 306 allows project development to be journaled within the repository system, and also allows any version of the control project 306 to be selected and deployed to the automation system as part of a disaster recovery procedure in the event that portions of the control project executing on the plant floor are lost and must be reinstalled, or if a new version of the control project 306 is not performing as required and a previous version must be re-deployed. These functions can be managed by the repository system's asset recovery component 214.

In some embodiments, when a new version of control project 306 is submitted to the IDH repository system 202, the asset recovery component 214 can analyze the new version of the control project 306 with one or more previous versions 310 stored in the customer repository 324 and identify any potential new problems introduced in the new version relative to previous versions. Asset recovery component 214 may also apply customer-defined project analysis queries defined in the plant standards to the new version of the control project 306, as well as generalized project analysis queries defined as part of standards definitions 322 stored in the repository system's knowledgebase 328. These generalized and custom queries can be configured to identify specific design scenarios within the control project 306 that may lead to non-optimal control performance. Asset recovery component 214 can render results of these project analytics as recommendations 1102.

In some embodiments, if an upgrade to a software application used by the control project 306 is available, customers may submit a current version of their control project (e.g., v.X) for upgrade to the newest version (e.g., v.Y). Asset recovery component 214 can also be configured to manage these upgrades. When a control project 306 to be upgraded is uploaded to the repository system 202 by a customer, asset recovery component 214 can analyze the control project 306 and perform the upgrade, performing any file conversions necessary to perform the v.X-to-v.Y upgrade. As part of this upgrade, asset recovery component 214 can also apply any of the project analytics discussed above (e.g., analytics similar to that applied by the project analysis component 210) to the uploaded control project 306. Upon completion of the upgrade, asset recovery component 214 can provide the upgraded control project files together with recommendations (e.g., project recommendations 702 described above) for improving operation of the control system or optimizing resource utilization by the control project 306 itself.

By allowing multiple versions of a control project to be archived in the customer repository 324 and deployed to the plant floor devices on demand, the repository system's storage and deployment features can allow users to deploy different versions of the same control project at different industrial facilities. This functionality can be useful to system integrators or other control solution providers who serve multiple customers having different sets of industrial assets on which the control project 306 will be executed, since different versions of the control project 306 may be necessary for execution at different customer sites.

Asset recovery component 214 can also implement cybersecurity features that verify an authenticity of a submitted control project 306 to ensure that the project 306 was developed and submitted by a reliable source. This authentication can be based in part on program code similarity. For example, when a new version of a control project 306 is submitted, asset recovery component 214 can compare this new version with one or more previous project versions 310 previously submitted to and archived by the repository system 202. If this comparison yields a determination that the new version is drastically different from previous versions 310 uploaded by the same customer entity, the asset recovery component 214 can flag the newly submitted control project 305 and initiate delivery of a security notification to trusted personnel associated with the customer requesting that the new version be reviewed and authorized. In some embodiments, asset recovery component 214 may also prevent deployment of the new version of the control project unless authorization from a trusted person is received. Asset recovery component 214 may also authentication new control projects 306 based on adherence to or deviation from the customer's known coding style and standards, which can be recorded in the customer repository 324 as part of plant standards 314.

Figure 12:
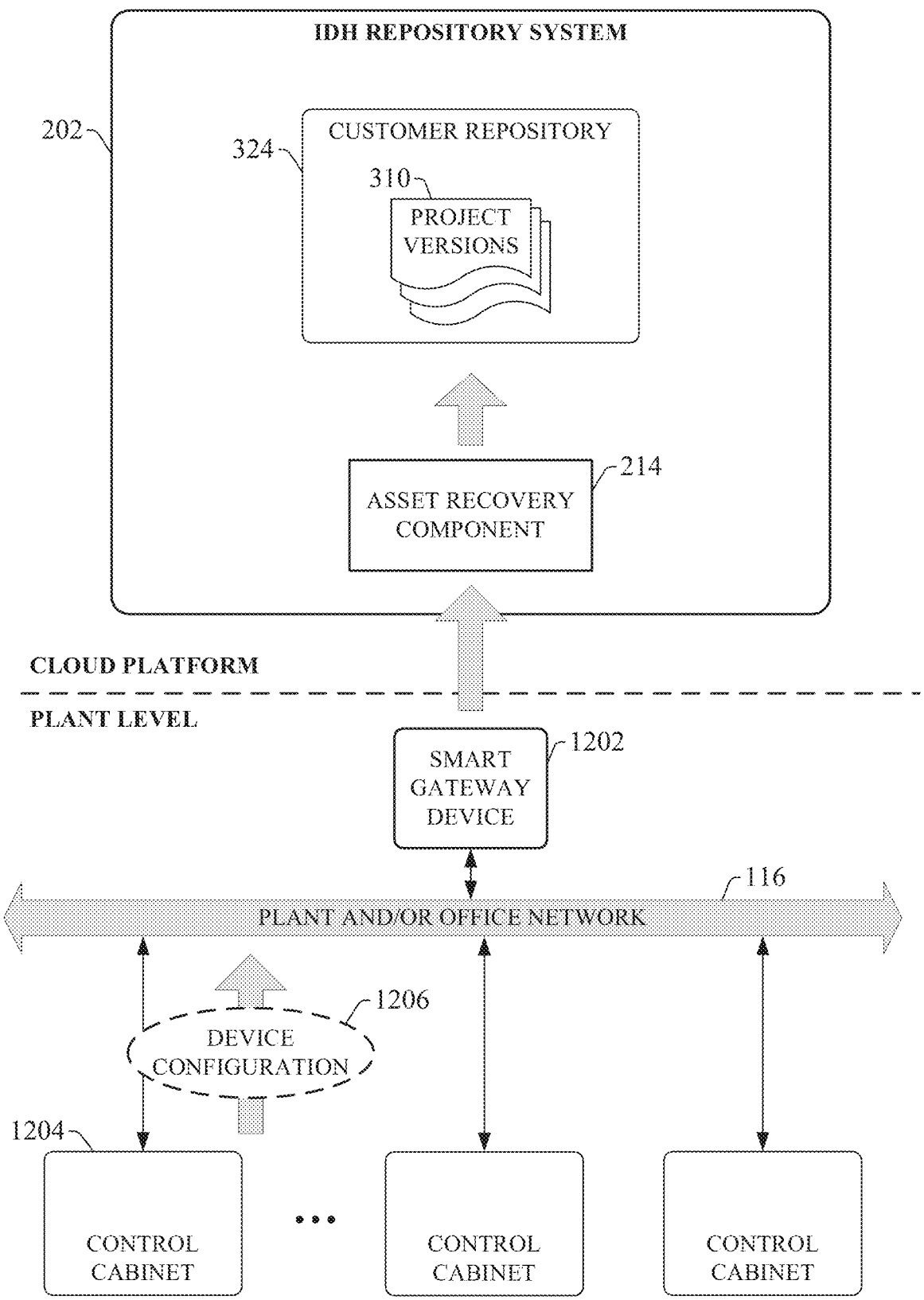
FIG. 12 is a diagram illustrating intelligent backup of device configuration data to an IDH repository system.

Some embodiments of the IDH repository system 202 can also offer "backup as a service" for industrial asset configuration files or project files. FIG. 12 is a diagram illustrating intelligent backup of device configuration data 1206 to the IDH repository system 202. In some embodiments, software agents on-premise at the customer facility can look for supported industrial devices or assets (e.g., assets installed in control cabinets 1204) and initiate backups of the device configuration data 1206 installed on those devices. Device configuration data 1206 can include control code, configuration parameter settings, HMI applications, or other such control project data. In some embodiments, these software agents can be deployed and managed by a smart gateway device 1202 that reside on the plant network 166 and serves as a gateway or edge device that connects the industrial assets on the plant floor with the IDH repository system 202. In such embodiments, smart gateway device 1202 can deliver copies of device configuration data 1206 to the IDH repository system 202, and the asset recovery component 214 can store a backup of the device configuration data 1206 in the customer repository 324 as part of the stored project versions 310 for that customer.

Project backups can also be configured to be version-driven, such that the asset recovery component 214 uploads and archives changes to the control project in response to detecting a modification to the project on the plant floor (e.g., when a plant engineer modifies the ladder logic on an industrial controller via a direct connection to the controller). In still another scenario, backups for asset configuration files can be scheduled, such that the asset recovery component 214 retrieves and archives the current device configurations at defined times or according to a defined backup frequency.

Figure 13:
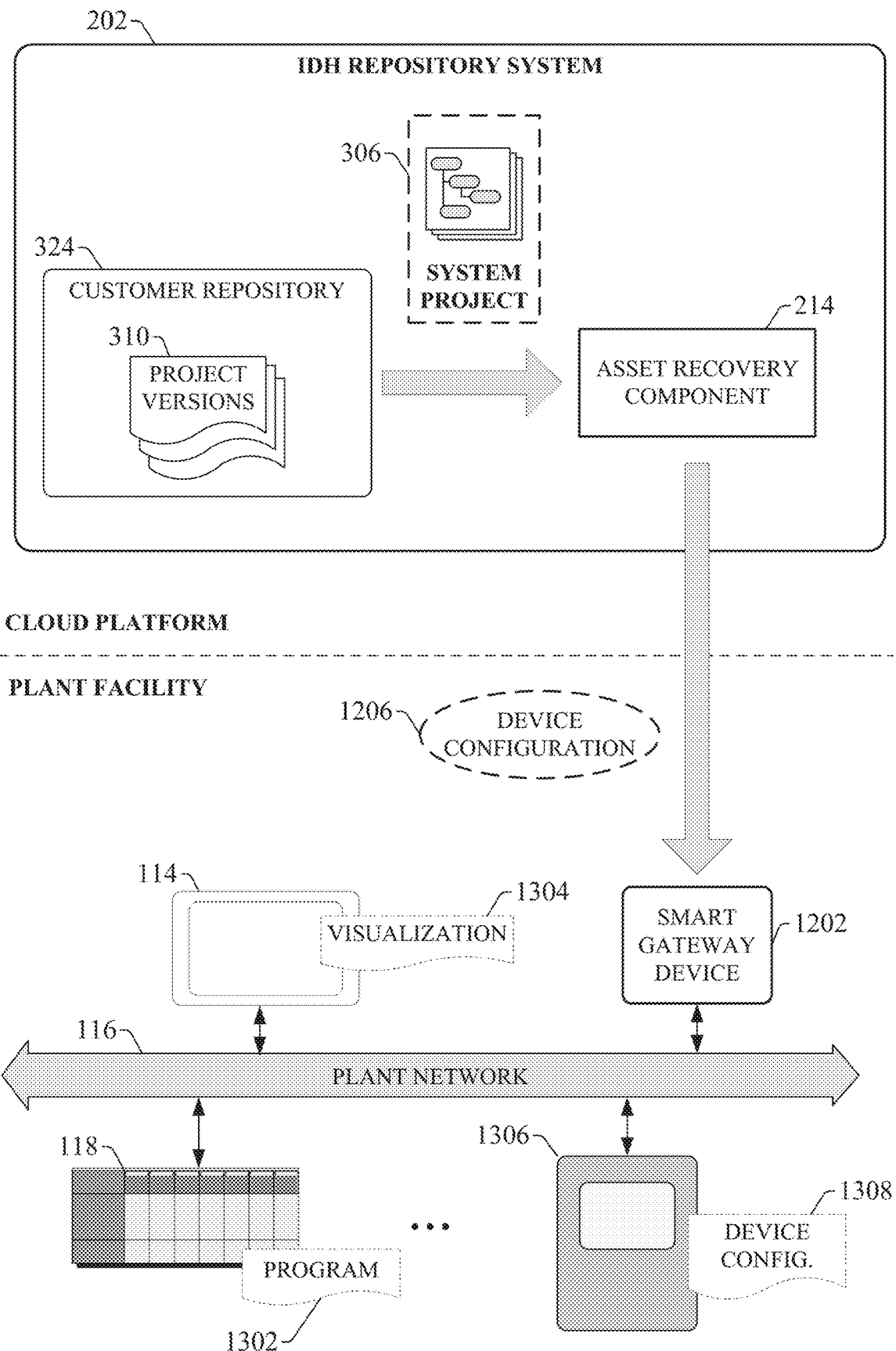
FIG. 13 is a diagram illustrating an example restore process that can be initiated by through an IDH repository system.

With backups of the control project archived in the customer repository 324, device configurations to be restored from the last known backup in the event of a disaster. FIG. 13 is a diagram illustrating an example restore process that can be initiated by through the IDH repository system 202. In this example, an industrial environment includes one or more industrial controllers 118, HMIs 114, motor drives 1306, servers running higher level applications (e.g., ERP, MES, etc.), and other such industrial assets. These industrial assets are connected to the plant network 116 (e.g., a common industrial protocol network, an Ethernet/IP network, etc.) that facilitates data exchange between industrial devices on the plant floor. Plant network 116 may be a wired or a wireless network.

When a control project 306 is to be deployed during a restore operation, the project 306 can be commissioned to the plant facility via a secure connection between the smart gateway device 1202 and the cloud platform on which the repository system 202 resides. Asset recovery component 214 can translate the archived control project 306 to one or more appropriate executable files—control program files 1302, visualization applications 1304, device configuration files 1308, system configuration file, etc.—and deploy these files to the appropriate devices in the plant facility to facilitate deployment or restore of the control project.

This backup and restore architecture can also be used to upload system configurations from one facility and deploy them at another facility, or to upload configurations from an OEM and deploy them to a customer site. As part of the deployment procedure, the asset recovery component 214 can first poll the target devices on the plant floor to verify that those devices are capable of supporting and executing the control project files that are being deployed.

By affording a common storage and analysis platform on which multiple customers can upload and assess their control solutions, the IDH repository system 202 can accelerate modern automation development by creating an open ecosystem for engineers to share and reuse code from private and public repositories, allowing them to easily manage and collaborate with their own content and from others they trust to accelerate core control development.

Figure 14:
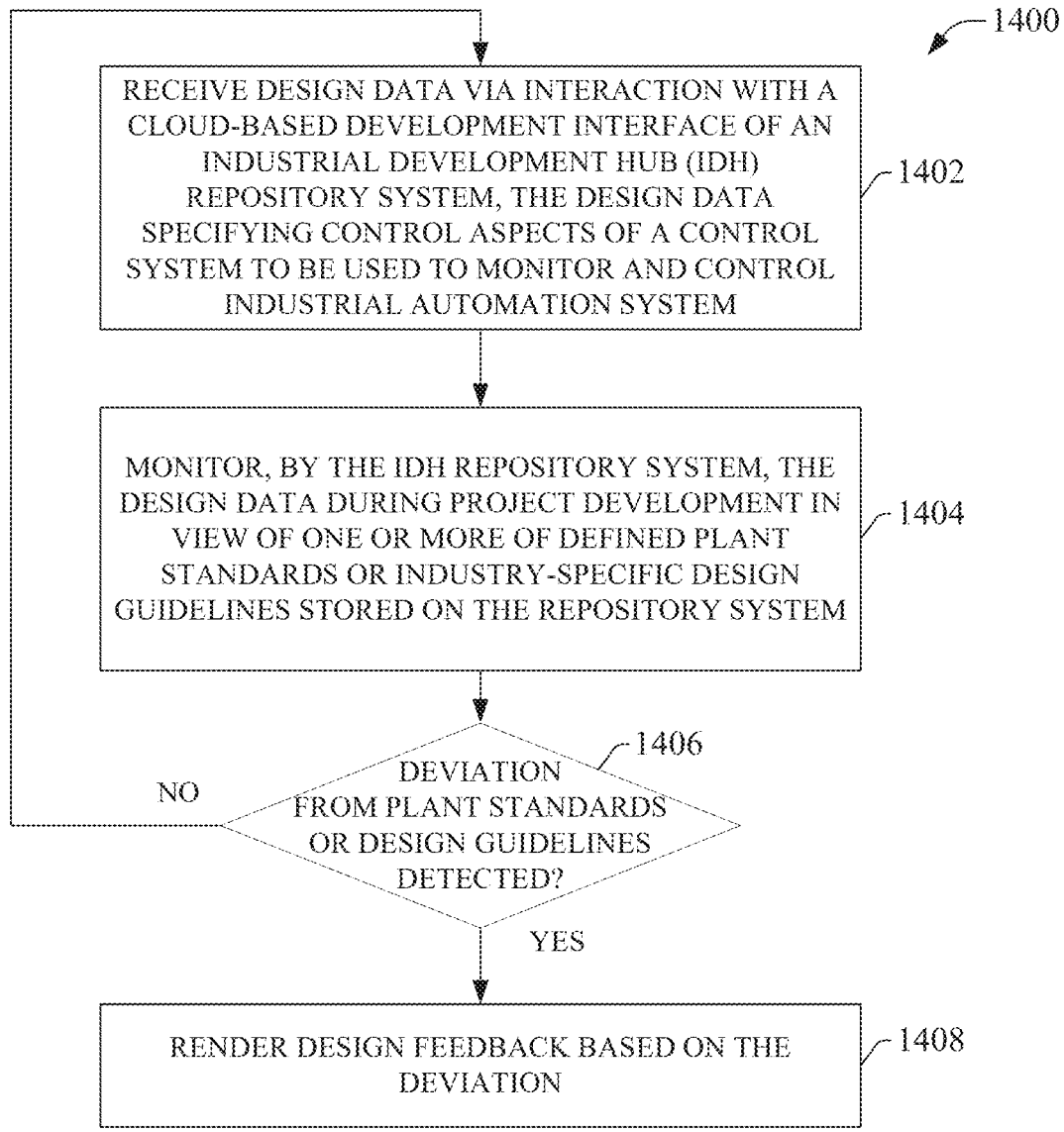
FIG. 14 is a flowchart of an example methodology for providing real-time design feedback for an industrial control project during development using a cloud-based IDH repository system.
Figure 15A:
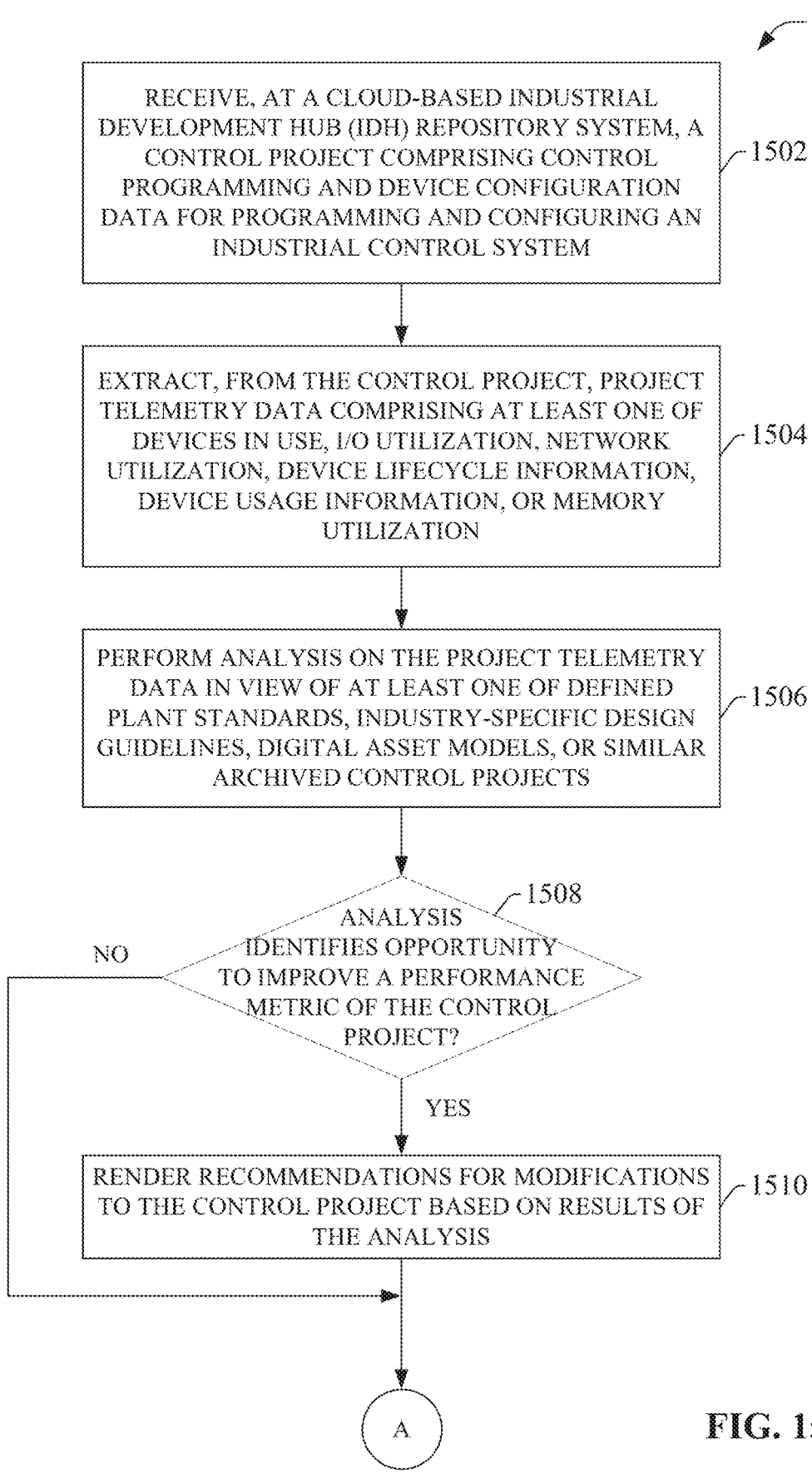
FIG. 15*a* is a flowchart of a first part of an example methodology for performing control project analytics on an uploaded control project and collecting vendor-specific device usage statistics based on results of the analytics.
Figure 15B:
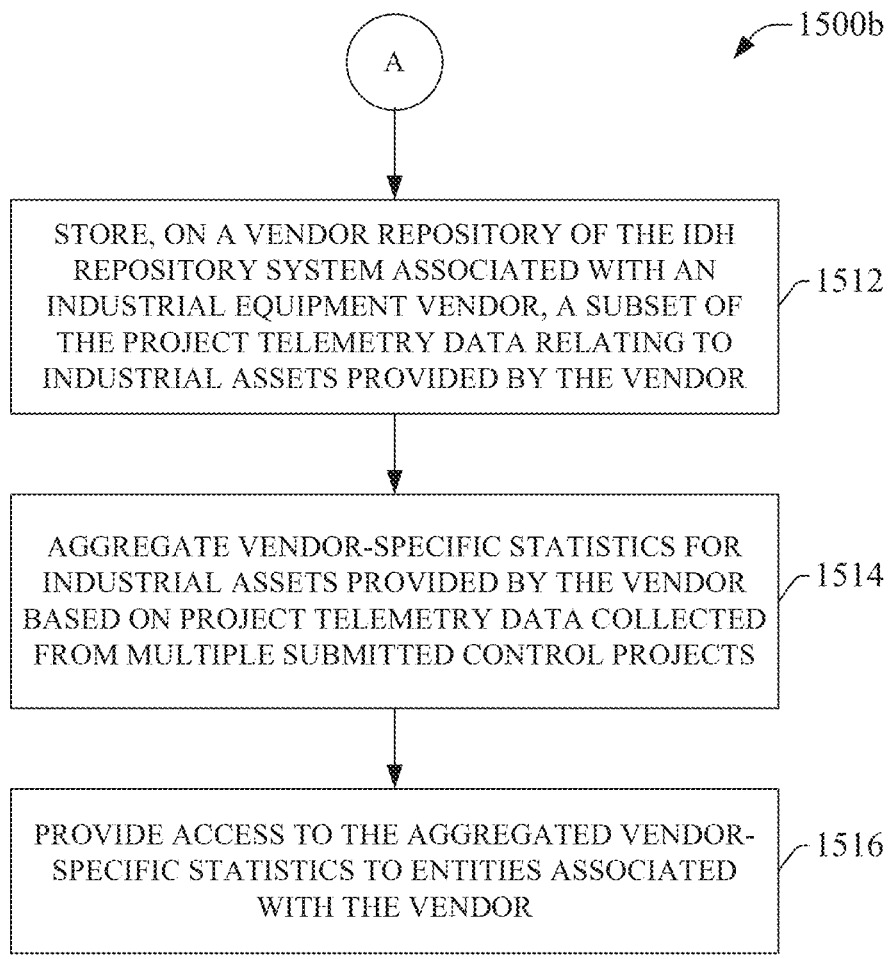
FIG. 15*b* is a flowchart of a second part of the example methodology for performing control project analytics on an uploaded control project and collecting vendor-specific device usage statistics based on results of the analytics.

FIGS. 14-15b illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 14 illustrates an example methodology 1400 for providing real-time design feedback for an industrial control project during development using a cloud-based IDH repository system. Initially, at 1402, design data is received via interaction with a cloud-based IDH repository system. The design data can specify control aspects of a control system to be used to monitor and control an industrial automation system, and can be received in the form of industrial control programming (e.g., ladder logic, sequential function charts, scripted control code such as an industrial DSL, etc.), HMI screen development input, industrial device or equipment selections and configuration data (e.g., device configuration parameter values), or other such design input. In some embodiment, the design data can be submitted to the IDH repository system via interaction with a control system development platform served to a client device by the repository system, where the development platform comprises development tools for programming industrial control code, designing HMI interface displays, setting device parameters, or other such design actions.

At 1404, during receipt of the design data—that is, as a user proceeds through control project development—the repository system monitors the design data in view of one or more of defined plant standards or industry-specific design guidelines stored on the repository system. Plant standards can be uploaded to the repository system by engineers or administrators at the plant facility and stored in a customer-specific repository, and can define such engineering standards as preferred control code formatting, orders in which certain control sequences are to be carried out, control interlocks that must be in place before certain control actions can be executed, permitted control setpoint ranges, preferred device operating ranges or configuration parameters, preferred network settings, or other such engineering standards and preferences. The plant standards may also define standards specific to the control project being developed, including functional specifications or safety validation requirements.

Industry-specific guidelines can also be stored and maintained on the repository system, and may be categorized according to relevant industrial verticals. These industry-specific guidelines may specify, for example, emissions or energy consumption requirements, required safety integrity levels, industry-standard interlocks, or other such standards.

At 1406, a determination is made, based on the monitoring performed at step 1404, whether a portion of the design data received at step 1402 deviates rom the plant standards or design guidelines. These deviations may comprise, for example, non-conformity to approved control coding practices, insufficient safety interlocking associated with a control operation, device configuration settings that fall outside an approved range, or other such deviations. If no such deviations are detected (NO at step 1406), the methodology returns to step 1402 and steps 1402-1406 repeat. Alternatively, if a deviation is detected (YES at step 1406), the methodology proceeds to step 1408, where the IDH repository system renders design feedback based on the deviation. The feedback can notify the designer of the deviation, and offer recommendations for modifying the design in a manner that brings the design within the plant-specific and industry-specific guidelines.

FIG. 15*a* illustrates a first part of an example methodology 1500*a* for performing control project analytics on an uploaded control project and collecting vendor-specific device usage statistics based on results of the analytics. Initially, at 1502, a control project is received at a cloud-based IDH repository system. The control project can be uploaded by customer (e.g., authorized personnel at a plant facility at which the control project operates) for archival or analysis purposes, or automatically archived to the repository system as part of a backup-and-restore procedure. The control project comprises control programming and device configuration data for programming and configuring an industrial control system at the plant facility.

At 1504, project telemetry data is extracted from the control project by the repository system. This project telemetry data can comprise, for example, an inventory of devices that make up the control system, I/O utilization of the devices, network resources (e.g., communication bandwidth) utilized by the control system, predicted device lifecycle information, an expected frequency of operating cycles of one or more of the devices, an expected processing load on one or more of the devices as a result of executing the control project, an expected amount of device memory consumed as a result of executing the control project, a subset of available features of a device that are being utilized by the control project, or other such telemetry.

At 1506, analysis is performed on the project telemetry data extracted at step 1504 in view of at least one of defined plant standards, industry-specific design guidelines, digital asset models, or similar archived control project stored on the repository system. For example, the submitted control project can be assessed for deviations from plant or industry-specific design standards and guidelines, as discussed in step 1406 in methodology 1400. The repository system can also compare the control project with a subset of other archived control projects that perform similar control functions to that of the submitted project (e.g., projects designed to control similar machinery within similar industries, or to otherwise perform similar control functions) to determine whether portions of the control project design deviate from more common design approaches for similar control functions.

The repository system can also access digital asset models representing devices used in the control project (and identified in the telemetry data) in order to determine how these devices are used relative to the design specifications and available features. For example, based on information maintained on device-specific asset models, the repository system can determine what percentage of the device's available I/O is currently being used in the control project, what percentage of the device's available memory or processing capacity will be consumed by the control project (e.g., as a result of executing the proposed control code), which of the device's available features are not being utilized by the control project, or other such statistics.

At 1508, a determination is made as to whether the analysis performed at step 1506 identifies an opportunity to improve a performance metric of the control project. If such an opportunity is identified (YES at step 1508), the methodology proceeds to step 1510, where the repository system renders recommendations for modifications to the control project based on results of the analysis. These can include, for example, recommendations for reducing the memory or processing utilization by one or more devices of the control system, recommendations for altering the control project in a manner that extends the expected lifecycle for a device (e.g., by reducing the operating frequency of the device), indications of unused device features that may improve performance if utilized, or other such recommendations.

The methodology then proceeds to the second part 1500*b* illustrated in FIG. 15*b*. At 1512, a subset of the project telemetry data (extracted at step 1504) relating to industrial devices or assets provided by a particular equipment vendor is stored in a vendor repository associated with that vendor. This subset of telemetry data can include, for example, which of the vendor's devices are being used by the control project, which available features of the devices are being used and which are unused, how closely the devices are being operated to their maximum operating constraints (e.g., in terms of memory, processing power, speed, etc.), or other such information. At 1514, vendor-specific statistics collected from the project telemetry data of multiple submitted control projects are aggregated by the repository system and stored in the vendor repository. These vendor-specific statistics relate to industrial assets that are offered by the vendor and in use at multiple customer facilities that participate in the IDH repository platform. At 1516, the repository system provides access to the aggregated vendor-specific statistics to entities associated with the vendor. These statistics can comprise, for example, the numbers of each of the vendor's products that are deployed at customer locations, how those products are being used in the field, which degree to which features of the vendor's products are being used, how closely the vendor's products are being operated to their engineering capacities, the geographic locations at which the vendor's respective products are being used, or other such statistics.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including Device-Net, ControlNet, safety networks, and Ethernet/IP. Other networks include Ethernet, DH/DH+, Remote I/O, Fieldbus, Modbus, Profibus, CAN, wireless networks, serial protocols, Open Platform Communications Unified Architecture (OPC-UA), and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 16:
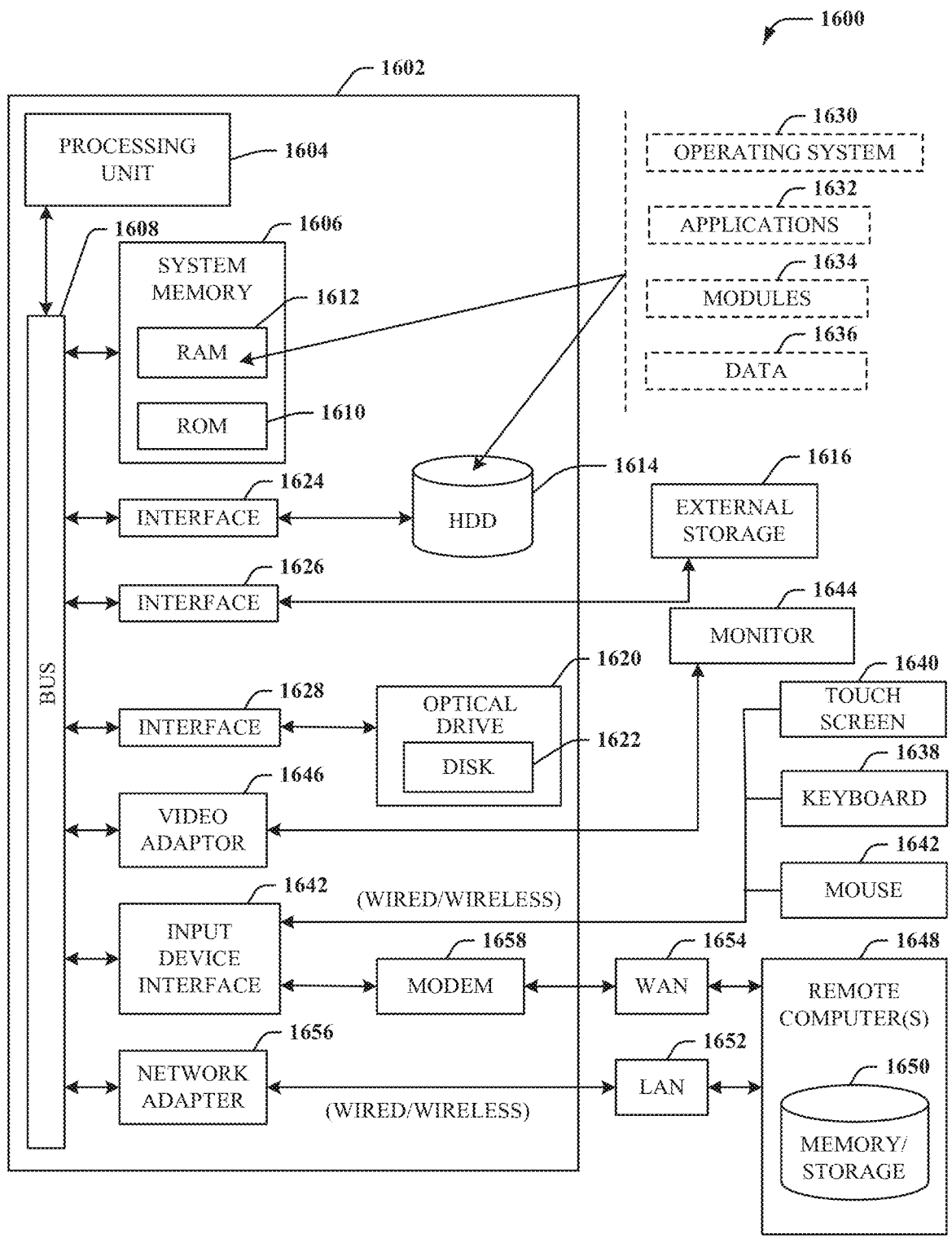
FIG. 16 is an example computing environment.
Figure 17:
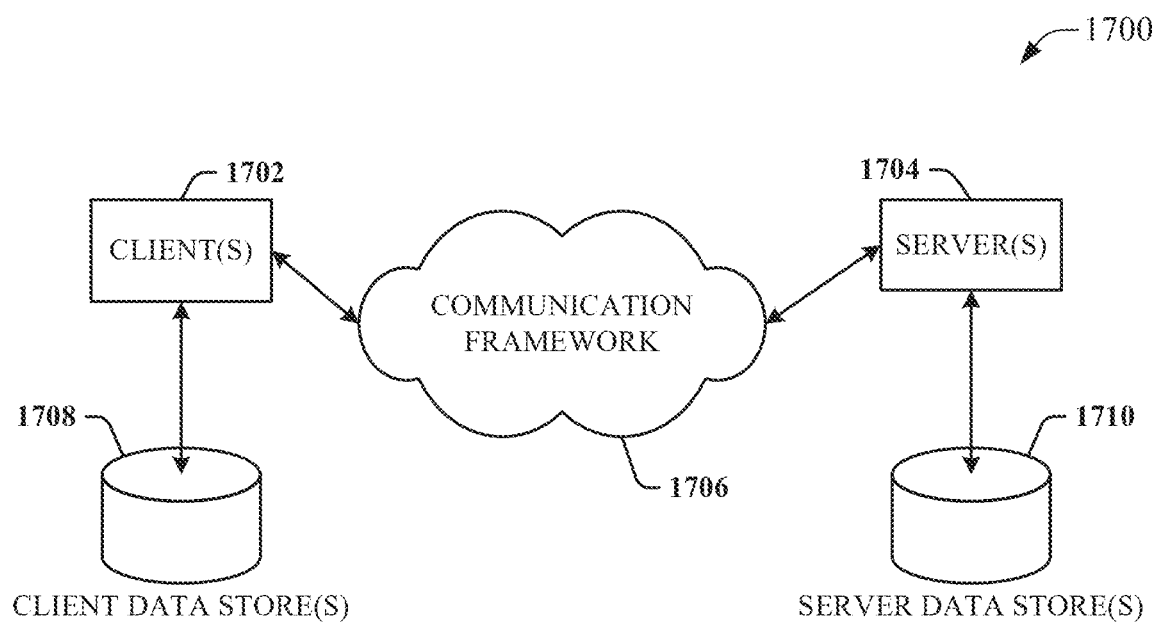
FIG. 17 is an example networking environment.

In order to provide a context for the various aspects of the disclosed subject matter, FIGS. 16 and 17 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 16, the example environment 1600 for implementing various embodiments of the aspects described herein includes a computer 1602, the computer 1602 including a processing unit 1604, a system memory 1606 and a system bus 1608. The system bus 1608 couples system components including, but not limited to, the system memory 1606 to the processing unit 1604. The processing unit 1604 can be any of various commercially available processors. Dual microprocessors and other multi-processor architectures can also be employed as the processing unit 1604.

The system bus 1608 can be any of several types of bus structure that can further interconnect to a memory bus (with or without a memory controller), a peripheral bus, and a local bus using any of a variety of commercially available bus architectures. The system memory 1606 includes ROM 1610 and RAM 1612. A basic input/output system (BIOS) can be stored in a non-volatile memory such as ROM, erasable programmable read only memory (EPROM), EEPROM, which BIOS contains the basic routines that help to transfer information between elements within the computer 1602, such as during startup. The RAM 1612 can also include a high-speed RAM such as static RAM for caching data.

The computer 1602 further includes an internal hard disk drive (HDD) 1614 (e.g., EIDE, SATA), one or more external storage devices 1616 (e.g., a magnetic floppy disk drive (FDD) 1616, a memory stick or flash drive reader, a memory card reader, etc.) and an optical disk drive 1620 (e.g., which can read or write from a CD-ROM disc, a DVD, a BD, etc.). While the internal HDD 1614 is illustrated as located within the computer 1602, the internal HDD 1614 can also be configured for external use in a suitable chassis (not shown). Additionally, while not shown in environment 1600, a solid state drive (SSD) could be used in addition to, or in place of, an HDD 1614. The HDD 1614, external storage device(s) 1616 and optical disk drive 1620 can be connected to the system bus 1608 by an HDD interface 1624, an external storage interface 1626 and an optical drive interface 1628, respectively. The interface 1624 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1602, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1612, including an operating system 1630, one or more application programs 1632, other program modules 1634 and program data 1636. All or portions of the operating system, applications, modules, and/or data can also be cached in the RAM 1612. The systems and methods described herein can be implemented utilizing various commercially available operating systems or combinations of operating systems.

Computer 1602 can optionally comprise emulation technologies. For example, a hypervisor (not shown) or other intermediary can emulate a hardware environment for operating system 1630, and the emulated hardware can optionally be different from the hardware illustrated in FIG. 16. In such an embodiment, operating system 1630 can comprise one virtual machine (VM) of multiple VMs hosted at computer 1602. Furthermore, operating system 1630 can provide runtime environments, such as the Java runtime environment or the .NET framework, for application programs 1632. Runtime environments are consistent execution environments that allow application programs 1632 to run on any operating system that includes the runtime environment. Similarly, operating system 1630 can support containers, and application programs 1632 can be in the form of containers, which are lightweight, standalone, executable packages of software that include, e.g., code, runtime, system tools, system libraries and settings for an application.

Further, computer 1602 can be enable with a security module, such as a trusted processing module (TPM). For instance with a TPM, boot components hash next in time boot components, and wait for a match of results to secured values, before loading a next boot component. This process can take place at any layer in the code execution stack of computer 1602, e.g., applied at the application execution level or at the operating system (OS) kernel level, thereby enabling security at any level of code execution.

A user can enter commands and information into the computer 1602 through one or more wired/wireless input devices, e.g., a keyboard 1638, a touch screen 1640, and a pointing device, such as a mouse 1642. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1604 through an input device interface 1644 that can be coupled to the system bus 1608, but can be connected by other interfaces, such as a parallel port, an IEEE 1394 serial port, a game port, a USB port, an IR interface, a BLUETOOTH® interface, etc.

A monitor 1644 or other type of display device can be also connected to the system bus 1608 via an interface, such as a video adapter 1646. In addition to the monitor 1644, a computer typically includes other peripheral output devices (not shown), such as speakers, printers, etc.

The computer 1602 can operate in a networked environment using logical connections via wired and/or wireless communications to one or more remote computers, such as a remote computer(s) 1648. The remote computer(s) 1648 can be a workstation, a server computer, a router, a personal computer, portable computer, microprocessor-based entertainment appliance, a peer device or other common network node, and typically includes many or all of the elements described relative to the computer 1602, although, for purposes of brevity, only a memory/storage device 1650 is illustrated. The logical connections depicted include wired/wireless connectivity to a local area network (LAN) 1652 and/or larger networks, e.g., a wide area network (WAN) 1654. Such LAN and WAN networking environments are commonplace in offices and companies, and facilitate enterprise-wide computer networks, such as intranets, all of which can connect to a global communications network, e.g., the Internet.

When used in a LAN networking environment, the computer 1602 can be connected to the local network 1652 through a wired and/or wireless communication network interface or adapter 1656. The adapter 1656 can facilitate wired or wireless communication to the LAN 1652, which can also include a wireless access point (AP) disposed thereon for communicating with the adapter 1656 in a wireless mode.

When used in a WAN networking environment, the computer 1602 can include a modem 1658 or can be connected to a communications server on the WAN 1654 via other means for establishing communications over the WAN 1654, such as by way of the Internet. The modem 1658, which can be internal or external and a wired or wireless device, can be connected to the system bus 1608 via the input device interface 1642. In a networked environment, program modules depicted relative to the computer 1602 or portions thereof, can be stored in the remote memory/storage device 1650. It will be appreciated that the network connections shown are example and other means of establishing a communications link between the computers can be used.

When used in either a LAN or WAN networking environment, the computer 1602 can access cloud storage systems or other network-based storage systems in addition to, or in place of, external storage devices 1616 as described above. Generally, a connection between the computer 1602 and a cloud storage system can be established over a LAN 1652 or WAN 1654 e.g., by the adapter 1656 or modem 1658, respectively. Upon connecting the computer 1602 to an associated cloud storage system, the external storage interface 1626 can, with the aid of the adapter 1656 and/or modem 1658, manage storage provided by the cloud storage system as it would other types of external storage. For instance, the external storage interface 1626 can be configured to provide access to cloud storage sources as if those sources were physically connected to the computer 1602.

The computer 1602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 17 is a schematic block diagram of a sample computing environment 1700 with which the disclosed subject matter can interact. The sample computing environment 1700 includes one or more client(s) 1702. The client(s) 1702 can be hardware and/or software (e.g., threads, processes, computing devices). The sample computing environment 1700 also includes one or more server(s) 1704. The server(s) 1704 can also be hardware and/or software (e.g., threads, processes, computing devices). The servers 1704 can house threads to perform transformations by employing one or more embodiments as described herein, for example. One possible communication between a client 1702 and servers 1704 can be in the form of a data packet adapted to be transmitted between two or more computer processes. The sample computing environment 1700 includes a communication framework 1706 that can be employed to facilitate communications between the client(s) 1702 and the server(s) 1704. The client(s) 1702 are operably connected to one or more client data store(s) 1708 that can be employed to store information local to the client(s) 1702. Similarly, the server(s) 1704 are operably connected to one or more server data store(s) 1710 that can be employed to store information local to the servers 1704.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system, comprising:
a memory that stores executable components; and
a processor, operatively coupled to the memory, that executes the executable components, the executable components comprising:
a user interface component configured to receive, via a cloud platform, industrial control projects from respective different industrial customers, wherein the industrial control projects comprise at least control programming and device configuration data that, in response to execution on one or more industrial devices, facilitate monitoring and control of industrial automation systems comprising industrial equipment provided by multiple equipment vendors;
a project telemetry component configured to generate project telemetry data for the industrial control projects based on respective analyses of the industrial control projects, the project telemetry data comprising at least identities of a first subset of available features of the industrial equipment that are being utilized by the industrial control projects and a second subset of the available features that are unused by the industrial control projects; and
a project analysis component configured to, for a vendor of the multiple equipment vendors, aggregate a subset of the project telemetry data relating to a subset of the industrial equipment provided by the vendor to yield aggregated telemetry data, and generate usage statistic data for the subset of the industrial equipment based on the aggregated telemetry data, the usage statistic data comprising at least identities of the first subset of the available features and the second subset of the available features for the subset of the industrial equipment,
wherein the user interface component is configured to render the usage statistic data on a client device associated with the vendor as a usage statistic presentation.

2. The system of claim 1, wherein the project telemetry data further comprises at least one of identities of the one or more industrial devices, input or output devices connected to the one or more industrial devices, I/O modules associated with the one or more industrial devices, I/O utilization information, information identifying functional relationships between two or more units of the industrial equipment, estimated network bandwidths consumed by the automation systems, or estimated energy consumptions of the industrial automation systems.

3. The system of claim 1, wherein the usage statistic data further comprises at least one of identities of the subset of the industrial equipment, numbers of respective types of the subset of the industrial equipment being used by the industrial control projects, percentages of functional capacities of the subset of the industrial equipment being utilized by the industrial control projects, geographic information indicating where the subset of the industrial equipment are being used, or indications of frequencies of usage of the subset of the industrial equipment.

4. The system of claim 1, wherein the presentation comprises at least one of numbers of respective types of the subset of the industrial equipment in use at customer sites, a geographic breakdown indicating locations at which the respective types of the subset of the industrial equipment are being used, a chart indicating relative popularities of the subset of the industrial equipment, or a listing of the features of the subset of the industrial equipment being used by the industrial control projects.

5. The system of claim 1, wherein the user interface component is configured to omit, from the usage statistic presentation, proprietary information available from the industrial control projects that is set by the industrial customers to be hidden.

6. The system of claim 1, wherein the user interface component is configured to anonymize the industrial customers in the presentation.

7. The system of claim 1, wherein the first subset of the available features or the second subset of the available features comprise at least one of operating modes or configuration parameters being used by the industrial control projects.

8. The system of claim 1, wherein the project telemetry data further comprises amounts of memory or processing power of the one or more industrial devices required to execute the industrial control projects.

9. The system of claim 1, wherein
the project analysis component is further configured to generate a recommendation for modifying an industrial control project, of the industrial control projects, based on analysis of a subset of the project telemetry data generated for the industrial control project, and
the recommendation comprises at least one of a recommended replacement or reconfiguration of an industrial device to reduce an amount of memory or processing resources consumed by the industrial control project, a recommended replacement or reconfiguration for the industrial device to increase an I/O capacity for the industrial control project, a recommendation to utilize a currently unused feature of the industrial device to improve a performance metric of the industrial control project, or a recommended reconfiguration of the industrial control project to increase an expected lifespan of the industrial device.

10. The system of claim 1, wherein
an industrial control project, of the industrial control projects, comprises I/O configuration data for an industrial controller that is part of an industrial automation system of the industrial automation systems, and
the project telemetry component is configured to determine, based on analysis of the I/O configuration data, identities of devices that are connected to inputs and outputs of the industrial controller, and to generate the project telemetry data to include the identities of the devices.

11. A method, comprising:
receiving, by a system executing on a cloud platform and comprising a processor, industrial control projects from respective different industrial customers, wherein the industrial control projects comprise at least control programming and device configuration data that, in response to execution on one or more industrial devices, facilitate monitoring and control of industrial automation systems comprising industrial equipment provided by multiple equipment vendors;
generating, by the system, project telemetry data for the industrial control projects based on respective analyses of the industrial control projects, the project telemetry data comprising at least identities of a first subset of available features of the industrial equipment that are being utilized by the industrial control projects and a second subset of the available features that are unused by the industrial control projects;

for a vendor of the multiple equipment vendors, aggregating, by the system, a subset of the project telemetry data relating to a subset of the industrial equipment provided by the vendor to yield aggregated telemetry data;

generating, by the system, usage statistic data for the subset of the industrial equipment based on the aggregated telemetry data, the usage statistic data comprising at least identifies of the first subset of the available features and the second subset of the available features for the subset of the industrial equipment; and rendering, by the system, the usage statistic data on a client device associated with the vendor as a usage statistic presentation.

12. The method of claim 11, wherein the project telemetry data further comprises at least one of identities of the one or more industrial devices, input or output devices connected to the one or more industrial devices, I/O modules associated with the one or more industrial devices, I/O utilization information, information identifying functional relationships between two or more units of the industrial equipment, estimated network bandwidths consumed by the automation systems, or estimated energy consumptions of the industrial automation systems.

13. The method of claim 11, wherein the usage statistic data further comprises at least one of identities of the subset of the industrial equipment, numbers of respective types of the subset of the industrial equipment being used by the industrial control projects, percentages of functional capacities of the subset of the industrial equipment being utilized by the industrial control projects, geographic information indicating where the subset of the industrial equipment are being used, or indications of frequencies of usage of the subset of the industrial equipment.

14. The method of claim 11, wherein the rendering comprises rendering at least one of numbers of respective types of the subset of the industrial equipment in use at customer sites, a geographic breakdown indicating locations at which the respective types of the subset of the industrial equipment are being used, a chart indicating relative popularities of the subset of the industrial equipment, or a listing of the features of the subset of the industrial equipment being used by the industrial control projects.

15. The method of claim 11, wherein the rendering comprises omitting, from the usage statistic presentation, proprietary information available from the industrial control projects that is set by the industrial customers to be hidden.

16. The method of claim 11, wherein the rendering comprises omitting identities of the industrial customers in the presentation.

17. The method of claim 11, wherein the first subset of the available features or the second subset of the available features comprise at least one of operating modes or configuration parameters being used by the industrial control projects.

18. The method of claim 11, wherein the project telemetry data further comprises estimates of amounts of memory or processing power of the one or more industrial devices required to execute the industrial control projects.

19. A non-transitory computer-readable medium having stored thereon instructions that, in response to execution, cause a system executing on a cloud platform and comprising a processor to perform operations, the operations comprising:

receiving, via a cloud platform, industrial control projects submitted by respective different industrial customers, wherein the industrial control projects comprise at least control programming and device configuration data that, in response to execution on one or more industrial devices, facilitate monitoring and control of industrial automation systems comprising industrial assets provided by multiple equipment vendors;

generating, based on analysis of the industrial control projects, project telemetry data for the industrial control projects, wherein the project telemetry data comprises at least identities of a first subset of available features of the industrial assets being used by the industrial control projects and a second subset of the available features that are unused by the industrial control projects;

for a vendor of the multiple equipment vendors, aggregating a subset of the project telemetry data relating to a subset of the industrial assets provided by the vendor to yield aggregated telemetry data;

generating usage statistic data for the subset of the industrial assets based on the aggregated telemetry data, the usage statistic data comprising at least identities of the first subset of the available features and the second subset of the available features for the subset of the industrial assets; and rendering, on a client device associated with the vendor, a presentation that displays the usage statistic data.

20. The non-transitory computer-readable medium of claim 19, wherein the usage statistic data further comprises at least one of identities of the subset of the industrial assets, numbers of respective types of the subset of the industrial assets being used by the industrial control projects, percentages of functional capacities of the subset of the industrial assets being utilized by the industrial control projects, geographic information indicating where the subset of the industrial assets are being used, or indications of frequencies of usage of the subset of the industrial assets.

* * * * *